United States Patent
Ise et al.

(10) Patent No.: US 9,471,131 B2
(45) Date of Patent: Oct. 18, 2016

(54) APPARATUS AND MACHINE FOR REDUCING POWER CONSUMPTION OF MEMORY INCLUDING A PLURALITY OF SEGMENT AREAS, METHOD THEREFORE AND NON-TRANSITORY COMPUTER READABLE MEDIUM

(71) Applicant: KABUSHIKI KAISHA TOSHIBA, Tokyo (JP)

(72) Inventors: Kotaro Ise, Kawasaki (JP); Takeshi Ishihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 637 days.

(21) Appl. No.: 13/790,143

(22) Filed: Mar. 8, 2013

(65) Prior Publication Data

US 2013/0326252 A1 Dec. 5, 2013

(30) Foreign Application Priority Data

May 31, 2012 (JP) .................................. 2012-125215

(51) Int. Cl.
*G06F 1/00* (2006.01)
*G06F 1/32* (2006.01)

(52) U.S. Cl.
CPC ........... *G06F 1/3234* (2013.01); *G06F 1/3225* (2013.01); *G06F 1/3275* (2013.01); *Y02B 60/1225* (2013.01); *Y02B 60/1228* (2013.01)

(58) Field of Classification Search
CPC .. G06F 1/3203; G06F 1/3225; G06F 1/3234; G06F 1/3275; Y02B 60/1225
USPC ........ 711/104, 106, 207, 165, 170; 713/320, 713/322; 718/1
See application file for complete search history.

(56) References Cited

U.S. PATENT DOCUMENTS

| | | | |
|---|---|---|---|
| 7,752,470 B2 | 7/2010 | Huang et al. | |
| 8,745,426 B2 | 6/2014 | Machida et al. | |
| 2004/0098631 A1* | 5/2004 | Terrell, II | 713/322 |
| 2005/0125702 A1* | 6/2005 | Huang | G06F 1/3203 713/320 |
| 2007/0011421 A1* | 1/2007 | Keller et al. | 711/165 |

(Continued)

FOREIGN PATENT DOCUMENTS

| | | |
|---|---|---|
| CN | 1624628 | 6/2005 |
| JP | H07-160574 | 6/1995 |
| JP | 2003-036205 | 2/2003 |
| JP | 2004-118234 | 4/2004 |
| JP | 2005-196343 | 7/2005 |

(Continued)

OTHER PUBLICATIONS

Office Action mailed Jun. 17, 2014 in counterpart Japanese Patent Application No. 2012-125215 and English-language translation thereof.

(Continued)

*Primary Examiner* — Aurel Prifti
(74) *Attorney, Agent, or Firm* — Nixon & Vanderhye, P.C.

(57) ABSTRACT

According to an embodiment, there is provided with a non-transitory computer readable medium having instructions stored therein, which, when executed by a computer, causes the computer to execute steps including: calculating an access load on a memory area including a plurality of segment areas and determining, for each of the segment areas, one of a plurality of power states including a first power state and a second power state with its power consumption being lower than that of the first power state in accordance with the access load; and setting each of the segment areas to the power state determined therefor.

25 Claims, 16 Drawing Sheets

(56) References Cited

U.S. PATENT DOCUMENTS

| | | |
|---|---|---|
| 2008/0034234 A1* | 2/2008 | Shimizu et al. .............. 713/320 |
| 2008/0056051 A1* | 3/2008 | Mayer ...................... G11C 5/06 365/230.03 |
| 2009/0089531 A1* | 4/2009 | Johnson et al. .............. 711/170 |
| 2009/0222620 A1* | 9/2009 | Kanai ........................... 711/104 |
| 2011/0271070 A1* | 11/2011 | Worthington et al. ........ 711/165 |
| 2011/0296098 A1* | 12/2011 | Sauber et al. ................. 711/106 |
| 2012/0011504 A1* | 1/2012 | Ahmad et al. .................... 718/1 |
| 2012/0011508 A1* | 1/2012 | Ahmad ............................. 718/1 |
| 2012/0023349 A1* | 1/2012 | Machida et al. .............. 713/320 |
| 2012/0079232 A1* | 3/2012 | Hinton et al. ................. 711/207 |
| 2012/0275256 A1* | 11/2012 | Furutani .................. G11C 7/08 365/207 |

FOREIGN PATENT DOCUMENTS

| | | |
|---|---|---|
| JP | 4841070 | 12/2011 |
| JP | 2012-027655 | 2/2012 |
| WO | 2010/125852 | 4/2010 |

OTHER PUBLICATIONS

Huang et al., "Improving Energy Efficiency by Making DRAM Less Randomly Accessed", *ISLPED*, 2005, pp. 393-398.
Office Action mailed Jun. 15, 2015 in counterpart Chinese Patent Application No. 201310086886.1 and English language translation thereof.

* cited by examiner

| PHYSICAL AREA | SEGMENT NUMBER | ACCESS COUNT | ACCESS FREQUENCY | POWER STATE |
|---|---|---|---|---|
| 00000000 —1fffffff | 0 | 100 | 10.5 | ACTIVE |
| 20000000 —3fffffff | 1 | 200 | 21.0 | ACTIVE |
| ⋯ | ⋯ | ⋯ | ⋯ | ⋯ |
| e0000000 —ffffffff | 7 | 10 | 1.0 | SLEEP |

FIG. 5

ADDRESS TRANSLATION TABLE (a)

| | | | | |
|---|---|---|---|---|
| LOGICAL PAGE 0 | PHYSICAL PAGE ADDRESS =00001000(PAGE 1) | ATTRIBUTE =A00 | ATTRIBUTE =A01 | ATTRIBUTE =A0m |
| LOGICAL PAGE 1 | PHYSICAL PAGE ADDRESS =00002000(PAGE 2) | ATTRIBUTE =A10 | ATTRIBUTE =A11 | ATTRIBUTE =A1m |
| LOGICAL PAGE 2 | PHYSICAL PAGE ADDRESS =00004000(PAGE 4) | ATTRIBUTE =A20 | ATTRIBUTE =A21 | ATTRIBUTE =A2m |
| ... | | | | |
| LOGICAL PAGE N | PHYSICAL PAGE ADDRESS =00011000(PAGE 17) | ATTRIBUTE =AN0 | ATTRIBUTE =AN1 | ATTRIBUTE =ANm |

(b)

| | | | | |
|---|---|---|---|---|
| LOGICAL PAGE 0 | PHYSICAL PAGE ADDRESS =00001000(PAGE 1) | ATTRIBUTE =A00 | ATTRIBUTE =A01 | ATTRIBUTE =A0m |
| LOGICAL PAGE 1 | PHYSICAL PAGE ADDRESS =00004000(PAGE 4) | ATTRIBUTE =A10 | ATTRIBUTE =A11 | ATTRIBUTE =A1m |
| LOGICAL PAGE 2 | PHYSICAL PAGE ADDRESS =00002000(PAGE 2) | ATTRIBUTE =A20 | ATTRIBUTE =A21 | ATTRIBUTE =A2m |
| ... | | | | |
| LOGICAL PAGE N | PHYSICAL PAGE ADDRESS =00011000(PAGE 17) | ATTRIBUTE =AN0 | ATTRIBUTE =AN1 | ATTRIBUTE =ANm |

FIG. 10

APPARATUS AND MACHINE FOR
REDUCING POWER CONSUMPTION OF
MEMORY INCLUDING A PLURALITY OF
SEGMENT AREAS, METHOD THEREFORE
AND NON-TRANSITORY COMPUTER
READABLE MEDIUM

CROSS REFERENCE TO RELATED APPLICATIONS

This application is based upon and claims the benefit of priority from the prior Japanese Patent Application No. 2012-125215 filed on May 31, 2012, the entire contents of which are incorporated herein by reference.

FIELD

Embodiments described herein relate to a computer readable medium and a computation processing apparatus, and, for example, relates to a control technology for reducing power consumption of a memory device stored with, e.g., digital data.

BACKGROUND

Over the recent years, there has been an outstanding spread of computing machines as typified by personal computers, in which a technology of the computing machine is employed for executing a variety of information processes of mobile phones, copying apparatuses, home routers, etc. A characteristic of the technology of the computing machine is that the computing machine includes a memory device such as a DRAM (Dynamic Random Access Memory), processes data stored on the memory, stores the data as a result of being processed on the memory and thus executes processing the information in some cases. Namely, it is characteristic of these apparatuses to include a memory area in which to execute one or both of reading and writing the data.

Over the recent years, there has arisen a request for reducing the power consumption of the computing machine. Motivations, on which this request is based, are exemplified such as decreasing a power cost and preventing a malfunction of the computing machine due to an emission of the heat. Further, battery-driven apparatuses are demanded to extend a period of operating time, and so on. There are other multiple requests. The request for reducing the power consumption of the computing machine is subdivided into a request for reducing the power consumption of the memory device included in the computing machine.

In response to this request, e.g., the memory area is segmented into a plurality of segments called banks, and a power supply to the segment not containing valid data is stopped. In this connection, there is disclosed a technology targeted at yielding an effect in reducing the power consumption of the memory device.

Considered herein is a Web Tabbed Browser on which plural Web pages are opened. In this case, nothing is processed on a Web screen deployed by a user in the background. Nevertheless, the memory area for rendering the Web screen remains retained (or operated).

Alternatively, even in the case of booting a plurality of software components such as word processor software and spreadsheet software, the user operates one software component and therefore does not execute processing the software components other than the software being operated. Nevertheless, the memory areas for these software components remain retained, and, if there are a good number of retained memory areas, a problem is that the effect in reducing the power consumption is small.

BRIEF DESCRIPTION OF THE DRAWINGS

FIG. 5 is a diagram showing one example of a segment information management table;

FIG. 10 is an explanatory diagram of how an address translation table is rewritten correspondingly to page replacement;

DETAILED DESCRIPTION

According to an embodiment, there is provided with a non-transitory computer readable medium having instructions stored therein, which, when executed by a computer, causes the computer to execute steps including: calculating an access load on a memory area including a plurality of segment areas and determining, for each of the segment areas, one of a plurality of power states including a first power state and a second power state with its power consumption being lower than that of the first power state in accordance with the access load; and setting each of the segment areas to the power state determined therefor.

Hereinafter, embodiments will be described with accompanying drawings.

(First Embodiment)

Figure 1:
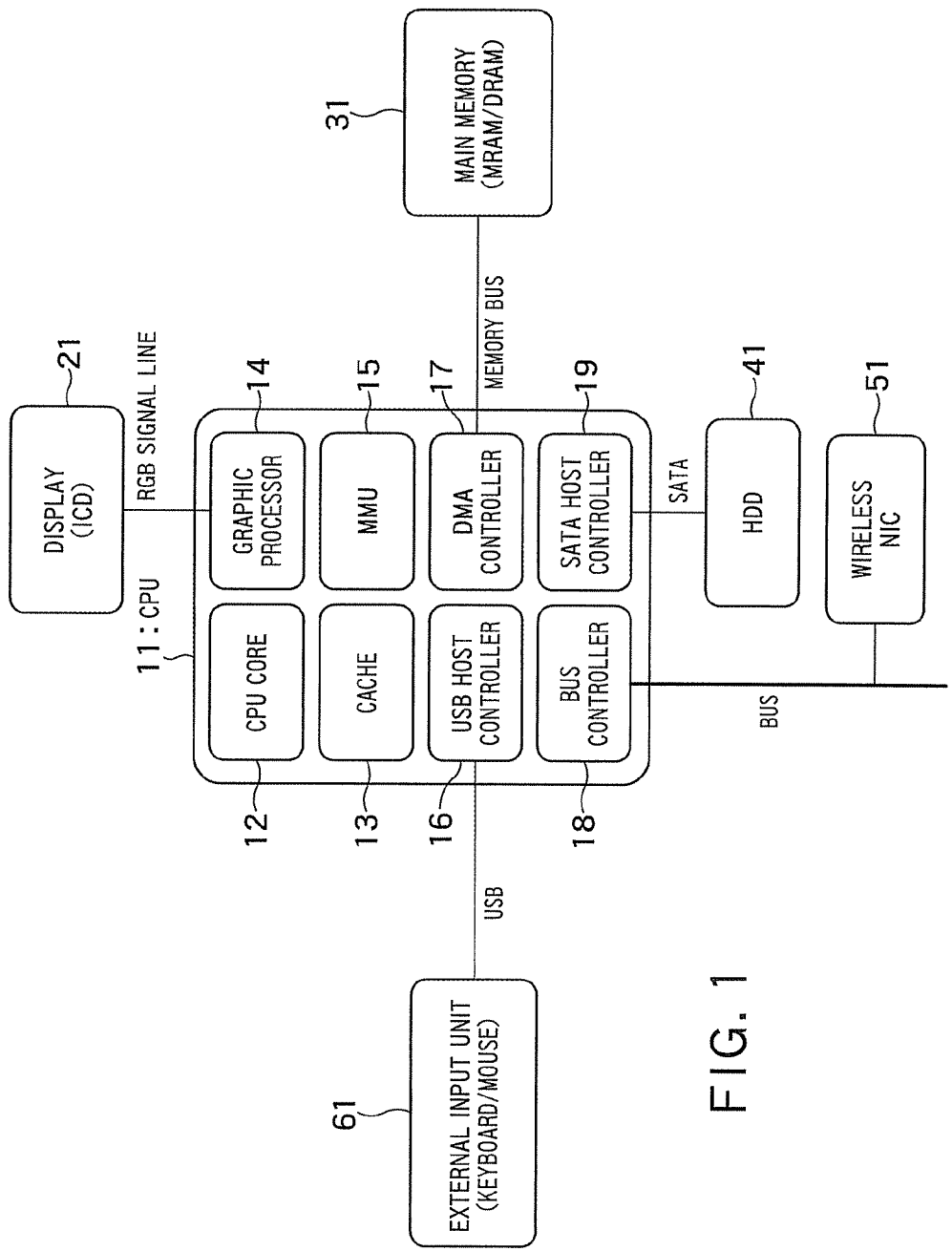
FIG. 1 is a diagram illustrating an example of a hardware configuration of a computing machine according to an embodiment.

FIG. 1 shows an example of a hardware configuration of a computing machine according to a first embodiment.

The computing machine includes a CPU 11, a display (e.g., LCD (Liquid Crystal Display)) 21, a main memory 31, an HDD (Hard Disk Drive) 41, a wireless NIC (Network Interface Card) 51 and an external input unit (a keyboard, a mouse, etc) 61, which are connected to the CPU 11. The CPU 11 includes one or more CPU core(s) 12, a cache area (which will hereinafter be simply termed a cache) 13, a graphic processor 14, an MMU (Memory Management Unit) 15, a USB (Universal Serial Bus) host controller 16, a DMA (Dynamic Memory Access) controller 17, a BUS controller 18 and a SATA (Serial Advanced Technology Attachment) host controller 19.

The CPU core 12 performs an arithmetic operation based on an executive instruction.

The graphic processor 14 generates RGB (Red-Green-Blue) signals in accordance with a rendering instruction given from the CPU core 12, and outputs the RGB signals to the display 21.

The cache 13 is a storage provided for improving a delay with which the CPU core 12 accesses the main memory 31. The CPU core 12 checks at first contents of the cache 13 when reading contents of the memory. If the cache 13 does not retain the contents, the values are read from the memory 31, and the contents are stored in the cache 13. Whereas if the contents exist in the cache 13, the values of the cache 13 are read. To begin with, the contents retained in the cache 13 are rewritten in order for the CPU core 12 to write the data in the memory 31. The rewritten contents are written to the main memory 31 according to a method called, e.g., a write back method or a write through method. A storage system used for the cache 13 can involve using a variety of storage systems such as an SRAM (Static Random Access Memory) and a DRAM (Dynamic RAM). It is desirable that the cache 13 be smaller in access delay than the main memory.

The MMU 15 is a device which translates a physical address used when accessing the main memory 31 and a virtual address (or a logical address, in which the virtual address and the logical address are used without any clear distinction therebetween in the present specification) used by an OS (Operating System) running on the CPU core 12 into each other. The virtual address is inputted, and the physical address associated with this virtual address is output. A memory within the MMU 15 may retain all items of address translation information of the virtual address and the physical address. Alternatively, some part of an address translation table may be retained by the MMU 15, while the rest of the table may be retained in an external unit such as the main memory 31. Exemplified as a method of retaining only some part of the address translation information is a method by which the MMU 15 includes a high-speed memory called a TLB (Translation Lookaside Buffer), only address translation data not retained in the TLB are acquired by referring to the main memory 31, and the acquired address translation data are written to the TLB.

The USB host controller 16 transmits and receives the information to and from USB devices on the basis of the USB (Universal Serial Bus) standard.

The DMA controller 17 executes a process of transmitting and receiving the data to and from the main memory 31, the devices (such as the wireless NIC) on the bus and the SATA devices (such as the HDD). The DMA controller 17 negotiates with the CPU core 12 for acquiring a control right of the bus. The DMA controller 17 acquiring the control right of the bus receives the data from the device on the bus, and writes the received data to the main memory 31. Alternatively, the DMA controller 17 reads the data of the main memory 31 and transmits the readout data to the device on the bus. The DMA controller 17 and the CPU core 12 correspond to a memory access device that accesses the main memory 31.

The BUS controller 18 transmits and receives the data to and from the device on the bus according to bus standard such as PCI-Express (Peripheral Component Interconnect Express).

The SATA host controller 19 transmits and receives the data to and from the device (HDD) via a SATA cable according to the SATA (Serial Advanced Technology Attachment) standard.

The display 21 converts the signals inputted through the RGB signals into a human readable format and thus displays the converted result.

The main memory 31 is, e.g., a DRAM (Dynamic Random Access Memory) and connected to the CPU 11 (including an unillustrated memory controller) via an interface (memory bus) called DDR3 (Double Data Rate type 3). It is further desirable that this main memory 31 is configured based on nonvolatile memory technologies of MRAM (Magneto-resistive Random Access Memory), FeRAM (Ferroelectric Random Access Memory), PRAM (Phase change Random Access Memory), ReRAM (Resistive Random Access Memory), and so on.

The main memory 31, when receiving a read command from the CPU 11, reads a value retained in a field associated with address information given together with the read command, and outputs the readout value to the CPU 11. Further when receiving a write command from the CPU 11, the main memory 31 receives the address information and the value together with the write command, and writes the received value to an area associated with the address information. An interface of the connection between the main memory 31 and the CPU 11 can involve using a variety of interfaces such as LPDDR3 (Low Power DDR3) and WideIO other than the DDR3.

The HDD 41 is a device for storing digital information of a magnetic medium as exemplified by MK1059GSM of TOSHIBA Corp. and is connected to the CPU 11 via the SATA interface. A semiconductor storage (NAND flash) called an SSD (Solid-State Drive) may be used as a substitute for the HDD. There are a variety of systems of storing the digital information; however, it is desirable that the storage has a larger capacity than the memory 31. The connection between the HDD 41 and the CPU 11 can involve using various types of interfaces such as SCSI (Small Computer System Interface), Fiber Channel and PCI-Express (Peripheral Component Interconnect Express) other than the SATA interface.

The wireless NIC (Network Interface Card) 51 transmits and receives communication packets to and from a network according to, e.g., a standard defined by IEEE802.11. The standard to be used is not limited to IEEE802.11, and the interface may be an interface oriented to cellular communications called an LTE (Long Term Evolution) interface and may also be a wired interface called a 100M Ethernet interface.

The external input unit 61 is a unit for inputting a human operation and may be, e.g., a keyboard, a mouse and a touch panel on the display. Further, the external input unit 61 may be a temperature sensor, in which the inputted information is not limited to the information given from a person. In the first embodiment, the external input is transmitted based on the USB standard to the CPU 11; however, the external input unit 61 may be connected based on standards (e.g., IEEE1394, RS-232C, HDMI (High-Definition Multimedia Interface)) other than the USB standard.

The first embodiment takes the configuration in FIG. 1 as the hardware configuration and can also take another configuration that any one or more of the graphic processor, the MMU, the USB host controller, the DMA controller, the BUS controller and the SATA host controller exist(s) outside the CPU 11. Furthermore, such a variety of modifications can be considered that the CPU 11 incorporates a part of functions of the wireless NIC.

[Hardware Configuration of Memory Module]

Figure 2:
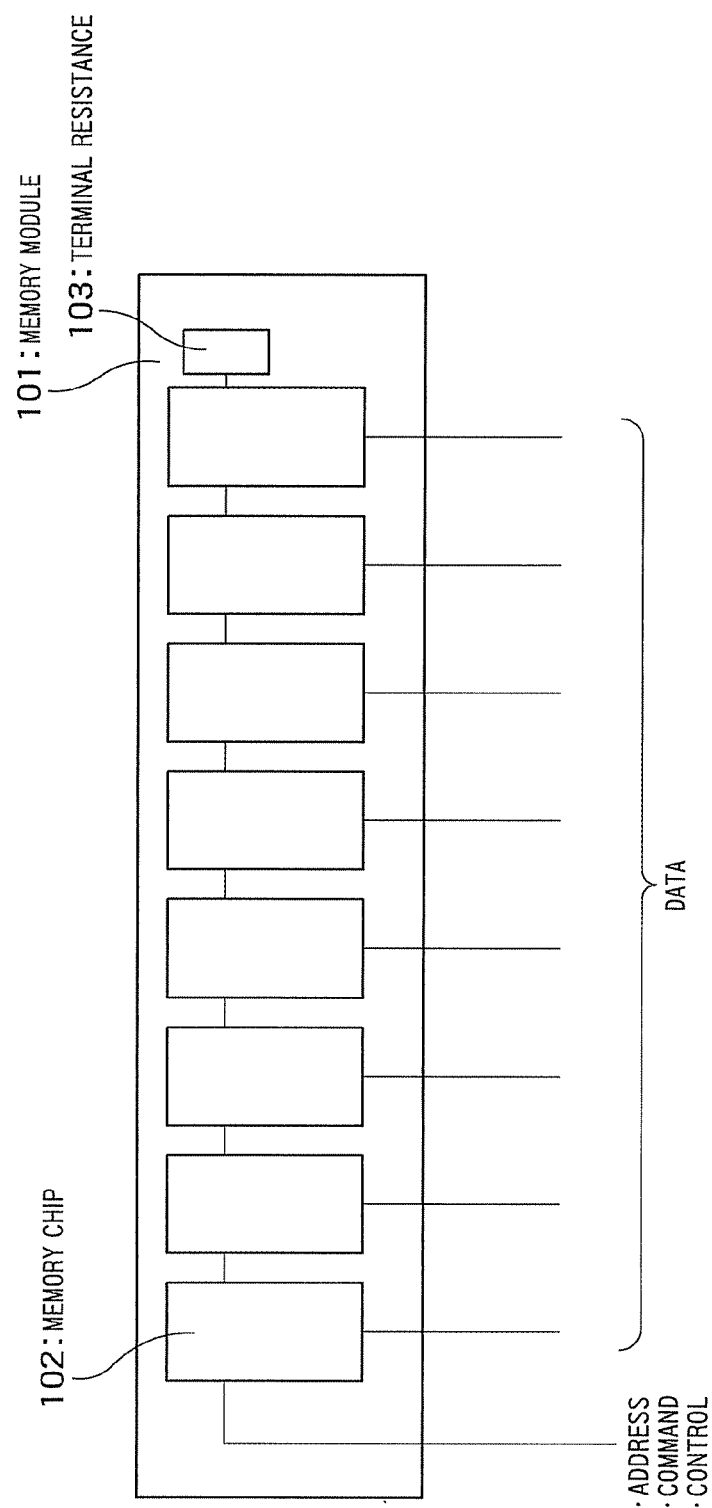
FIG. 2 is a diagram illustrating an example of a configuration of a memory module.

FIG. 2 shows an example of a configuration of a memory module used for the main memory 31.

A memory module 101 includes 8 pieces of memory chips (LSI) 102 on a substrate. The memory module 101 has signal lines for transmitting and receiving addresses, commands and control signals, and transmits the addresses, the commands and the control signals to the respective memory chips 102 via the signals lines. The commands are, as given below, the Read command, the Write command and, in addition, a PowerStateChange command for changing a power state of a segment (partial area) of the memory. The control signals are exemplified by a clock signal, a read/write timing signal, etc. Further, the memory module 101 has the signals lines for transmitting and receiving the data, and transmits and receives the data to and from the respective chips via the signal lines.

| Commands | Meanings |
|---|---|
| Read | To transmit the data retained in the segment specified by the address to the data signal line. |
| Write | To store the data given via the data signal line in the segment specified by the address. |
| PowerStateChange | To set the segment associated with the segment number, which is given via the command signal line, to the specified power state. |

Herein, two types of states, i.e., an active state and a sleep stare, exist as the power states. The data can be read from and written to the active segment. The data continues to be retained in the sleep segment but is disabled from being read therefrom and written thereto. The electric power consumed by the segment is larger in the active state than in the sleep state.

In the DRAM, the sleep state can be realized by selecting and setting the segment in a self-refresh mode. The self-refresh mode represents a status in which to perform a refresh operation (the operation is that the information retained in the memory cell gets volatile with an elapse of time in the DRAM, and hence a content of the memory cell is read out and again written to this cell) in an interior of the memory module or in an interior of the segment of the memory chip. The power consumption can be reduced by elongating a refresh interval. Further, generally a period of information retaining time of the memory cell of the DRAM becomes longer as the temperature becomes lower. Therefore, it is desirable for this self-refresh operation that the refresh interval is set longer as the temperature becomes lower. Moreover, there is a variation in information retaining time within the memory cell, and it is therefore desirable that the refresh interval is set long to the greatest possible degree in consideration of this variation.

While on the other hand, a nonvolatile memory such as an MRAM (magnetoresistive RAM) has no necessity for the electric power for retaining the information. Hence, the sleep state can be actualized by selecting the segment and stopping a supply of the electric power or decreasing a voltage the electric power for the read/write signals with respect to the memory cell thereof. It is further desirable to stop supplying the electric power or to decrease the voltage of the electric power supplied to other circuits such as a PLL (Phase-Locked Loop), a column decoder, a row decoder and a sense amplifier circuit and to stop clocks.

The memory module 101 is connected to the CPU 11 via the two types of signal lines. The CPU 11 can be connected to a plurality of memory modules. For example, the CPU 11 can be connected to the two memory modules per channel. In this case, the CPU 11, if having three channels, can be connected to totally six pieces of memory modules.

A memory area of each memory chip 102 is divided into eight segments. Each memory chip 102 is capable of changing the power state on a segment-by-segment basis. If the power state of, e.g., a segment 1 is specified from outside the memory module 101, it follows that all of the memory chips 102 come to a status where the power state of the segment 1 thereof is specified. Note that this configuration is one example, and such another configuration can be also taken that the segments 1 of all of the memory chips 102 are each treated as a different segment, and the power state thereof is individually controlled.

Figure 3:
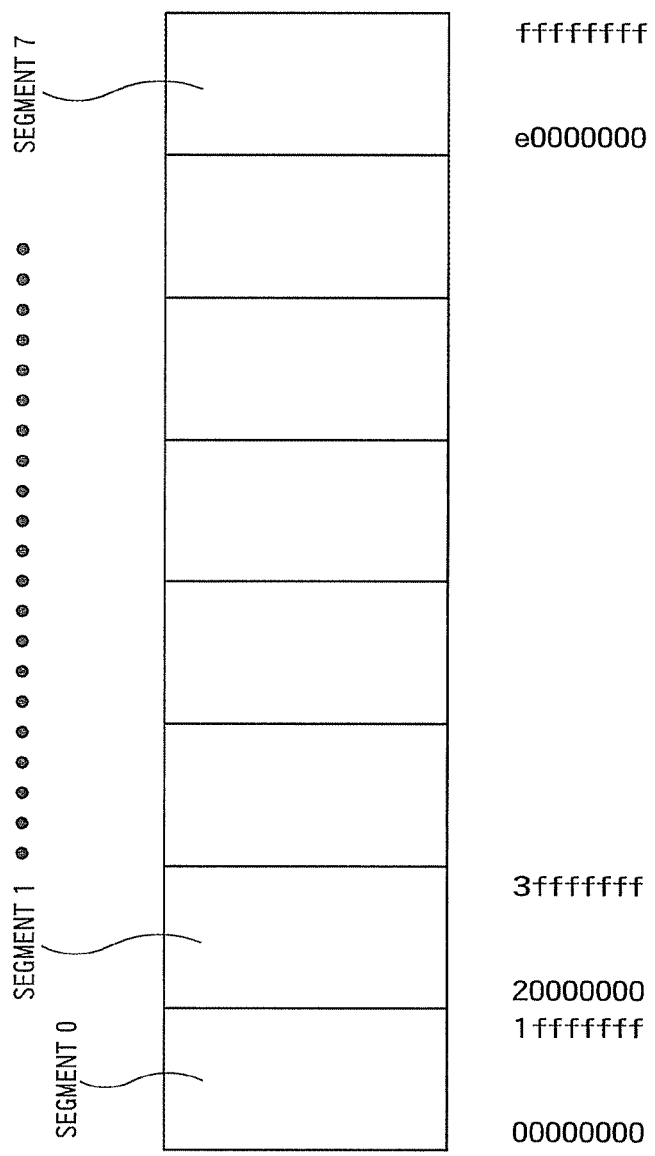
FIG. 3 is a diagram depicting relations between addresses and segments of the memory module.

FIG. 3 illustrates a relation between each address and each segment of the memory module.

An assumption is that the memory module 101 has the 8 segments, i.e., each memory chip 102 is divided into the 8 segments. It is depicted how a segment area specified by an address "0000000" and an address "1ffffff" belongs to the segment 0, while a segment area specified by an address "20000000" and an address "3ffffff" belongs to the segment 1.

A segment configuration in this example is that sizes of the respective segments are equalized; however, any inconvenience may not be caused by taking a configuration of setting the size of each segment to an arbitrary value. For instance, the segment 0 may be $1/128$ of a memory capacity; the segment be $1/128$; the segment 2 be $1/64$; the segment 3 be $1/32$; the segment 4 be $1/16$; the segment 5 be $1/8$; the segment 6 be $1/4$; and the segment 7 be $1/2$.

Furthermore, the case of having the 8 segments is described in FIG. 3; however, the number of segments is not limited to "8". Generally, though a larger effect in reducing the power consumption can be expected as the number of segments becomes greater, simultaneously the circuit scale for realizing the segment augments. There is a possibility that the increase in the number of segments leads to a rise in circuit packaging cost and a rise in power consumption.

[Outline of Operating Principle]

Upon switching on the power source of the computing machine, a program called BIOS (Basic Input-Output System) is read into the main memory 31 and is executed by the CPU core 12. The BIOS checks the hardware configuration of the computing machine, then initializes the respective devices (the HDD, the wireless NIC, etc) and reads the OS stored in the HDD 41 into the memory 31. After the OS has been read into the memory 31, the BIOS hands the control over to the OS (which implies a jump over to a predetermined command of the OS). The OS performs a boot process and executes a predetermined program. Alternatively, the OS boots the program according to an input from the external input unit.

The OS accesses the main memory 31 in response to a memory allocation (ensuring) request, a memory deallocation (freeing) request, a read/write request with respect to the allocated memory, which are given from the application. Moreover, the OS calculates an access load on the main memory 31. This access load expresses how much the loads such as an access frequency, a period of access time and a memory area usage quantity are applied to the memory. For example, there is exemplified the access frequency (a definition and a calculation method thereof will be described later on) on the segment-by-segment basis. A CPU clock count is also said to represent the access load. If being a high clock count, the calculation performance can be contrived to increase; however, the power consumption rises, resulting in an increase in load. Further, if being a long period of access time to the memory and if being a large usage quantity of the area, the large power consumption is applied, resulting in the rise in load. What is given above is one example, and other types of indices can be adopted as the access loads. In the following discussion, the description will be made by exemplifying the access frequency of the segment mainly for the sake of the explanation.

The power state of the segment is set in the active state if the access frequency of the segment is higher than a predetermined threshold value but is set in the sleep state whereas if not. There occurs a read/write event with respect to the segment area of the segment set in the sleep state, in which case the OS sets this segment in the active state but returns the setting to the sleep state after finishing the read/write event. Thus, the segment with a low access frequency is set in the sleep state, thereby enabling the power consumption of the main memory to be reduced. In the case of adopting the clock count as the access load, for instance, a segment count of the segments to be set in the sleep state is determined based on the clock count, and the segments specified by the segment count may be slept. On this occasion, a page exchange, which will be stated later on, may also be conducted (refer to a second embodiment). The segments to be slept may be determined preferentially from the longest in address line, i.e., from the largest in power consumption on the assumption that the segment with the longer address line has the larger power consumption for its being driven (refer to the description etc. of the second embodiment).

Herein, such an example has been exemplified that the OS sets the power state thereof in the active state when the read/write event occurs with respect to the segment in the sleep state, and returns the power state to the sleep state after the read/write event. This power state may; however, be changed by the memory controller and may also be changed by the memory chip on the memory module 101 in place of the OS. Alternatively, a control circuit (unillustrated) on the memory module 101 may also change the power state.

Furthermore, the memory controller, if retaining a multiplicity of not-yet-processed memory access requests, it is desirable that the accesses to a certain sleep segment be, if possible, aggregated and thus processed. That is, this sleep segment is set in the active state, the plurality of retained access requests to the segment is processed in aggregation, and, thereafter, this segment is returned to the sleep state. With this contrivance, the change count of the power state of the segment can be decreased, and the processing performance can be improved.

Herein, a threshold value $\lambda'$, for determining whether the power state of the segment is set active or sleeping, can be determined depending on characteristics of the memory module. For example, when the power is defined as follows;
$P_a$: power needed for keeping the active state,
$P_s$: power needed for keeping the sleep state,
$P_{sa}$: power needed when transitioning to the active state from the sleep state, and
$P_{as}$: power needed when transitioning to the sleep state from the active state, the threshold value $\lambda'$ can be obtained by the following formula;

$$\lambda' = \frac{(P_a - P_s)}{P_{sa} + P_{as}} \quad \text{[Mathematical Expression 1]}$$

This formula seeks what number of times a power gain (which is a difference between the power for residing in the active state and the power for residing in the sleep state) due to making the power state sleeping is equivalent to the power for accessing the segment in the sleep state (which is the power by which the power state transitions to the active state and the sleep state).

A comparison between the access frequency and then the threshold value $\lambda'$ is made with respect to each segment, and the power state is set in the active state if the access frequency is larger than the threshold value $\lambda'$ but set in the sleep state whereas if not. In the case of desiring to making the delay of the memory access smaller than the power consumption, it is desirable that a threshold value compared with the access frequency is set smaller than the threshold value $\lambda'$.

Further, a threshold value, which differs on the segment-by-segment basis, can be also used. For instance, if the segment size is different, a larger segment is easier to get into, the sleep state by setting a larger threshold value for a larger size of segment. This contrivance enables augmentation of the effect in reducing the power consumption.

If the CPU clock count dynamically changes depending on a CPU load, it is desirable to set this threshold value smaller as the CPU clock count becomes larger. This is because it is known from the empirical rule that the memory access frequency increases in proportion to the CPU clock count.

Moreover, if no problem arises even when the processing delay is large, it is desirable to increase this threshold value $\lambda'$. For instance, there are a case in which neither a mouse input nor a keyboard input (no event) of the user occurs for a fixed period of time and a case where the display thereby stops displaying. Consequently, a good number of segments get into the sleep state, whereby the power consumption can be reduced.

Further, this threshold value can be varied corresponding to a degree of the request for reducing the power consumption. For example, this threshold value is set larger as a residual quantity of the battery becomes smaller, thereby enabling the power consumption to be reduced. As a matter of course, the user may be enabled to adjust this threshold value by prompting the user to select menus such as "High Power", "Normal" and "Long Power" on a GUI (Graphical User Interface).

Herein, the access frequency is, e.g., measured as below. Let $S_i(T,2T)$ be the access count to a segment i during a period of a timing T through a timing 2T. Let $F_i(T,2T)$ be the access frequency during the period of the timing T through the timing 2T, and the access frequency can be calculated by the following formula, where a is a constant that is equal to or larger than "0" but equal to or smaller than "1".

$$F_i(0, T) = \frac{S_i(0, T)}{T} \quad \text{[Mathematical Expression 2]}$$

$$F_i(nT, (n+1)T) = a * F_i((n-1)T, T) + \frac{(1-a)S_i(n, (n+1)T)}{T}$$

$F_i(nT,(n+1)T)$ is obtained at every time interval T and compared with the threshold value, thus determining the power state (the active or sleep state) of the segment i in the next zone (n+2)T.

[Other Examples of Access Frequency]

In the example given above, the power state of the segment is determined by use of the access frequency $F_i(\ )$ This is said such that a prospective access frequency is predicted based on a past access frequency $F_i(\ )$ whereby the power state (the active or sleep state) of the segment is determined to minimize the prospective power consumption.

Further, the power state of the segment can be also determined with reference to task scheduling information of the OS. The task scheduling is defined as an algorithm for determining the sequence of assigning a plurality of tasks to the CPU in the multi-task OS. The task assigned to the CPU undergoes a process of the CPU only for a predetermined period of CPU time. Thereafter, the next-scheduled task is assigned to the CPU. A task execution sequence can be presumed by referring to the task scheduling information (e.g., a schedule queue).

Therefore, the tasks not yet assigned to the CPU are enumerated in predetermined time window, and the memory area (segment areas) used by these tasks is checked. In each segment, it is feasible to determine, as the sleep state, the power state of such a segment that the usage quantity of the memory used by the tasks not assigned to the CPU is larger than the predetermined quantity. The power state of the segment, in which the usage quantity of the tasks assigned to the CPU is zero, may be unconditionally determined as the sleep state.

Further, another example is that if information of an address translation table (a page table) is re-read into the MMU on the occasion of context switching of the OS, the power state of the segment can be also determined corresponding to a quantity for retaining the physical pages corresponding to the address translation table read into the MMU. To be specific, a certain type of OS sets, when conducting the context switching, the address translation table corresponding to the context in the MMU. The physical pages described in the address translation table set in the MMU are enumerated, and the number of the physical pages is counted on the segment-by-segment basis. The segments with their physical page count being equal to or larger than the predetermined threshold value are set in the active state. As will be described later on, when the program or the OS accesses the memory, the logical address needs to be translated into the physical address. It can be therefore expected that the delay of accessing the physical page with the address translation table not being set in the MMU may be large.

[Detailed Operation of OS]

Figure 4:
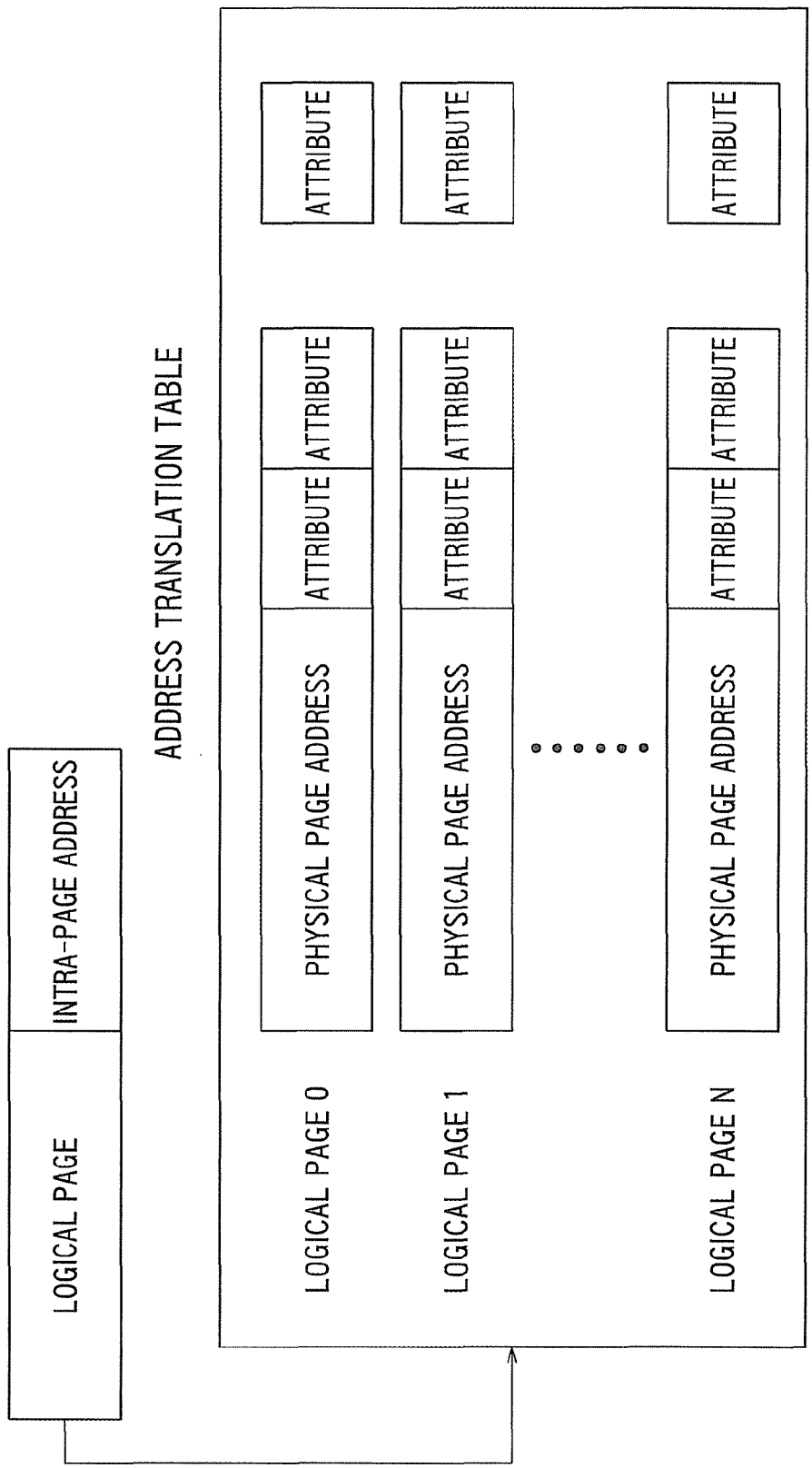
FIG. 4 is an explanatory diagram of an operation of address translation from a logical address into a physical address.

FIG. 4 illustrates the address translation from the logical address into the physical address simulatively.

The MMU 15 has the address translation table. The use of the address translation table enables an associated entry to be searched for based on a logical page number. Herein, an explanation will be made by way of an example on the assumption that an address width is 32 bits and a page size is 4 KB. Of the 32-bit logical address, the CPU uses high-order 22 bits for the logical page number and low-order 10 bits for an intra-page address. The search for the address translation table is made based on the logical page number determined from the logical address, thereby acquiring the associated entry. What combines the physical page address of this entry with the intra-page address is the physical address. Herein, the term "combining" implies that the intra-page address is combined as the low-order bits for the 22-bit physical page number.

The thus-searched entry retains multiple attributes related to the physical page. The attributes are exemplified such as cacheability, access information (readability/writability per privilege level), reference information (whether referred to or not), modifying information (whether modified or not) and existence information (whether existing on the physical memory or not).

Given herein is the case where the MMU 15 has one address translation table. The MMU 15 may include not the single address translation table but a plurality of address translation tables taking a hierarchical configuration called a multi-level page table. A size of the tables managed by the MMU 15 can be reduced by use of the multi-page table. What is important is that the information on the associated physical address is acquired based on the logical address.

Moreover, the address translation table possessed by the MMU 15 is retained by the OS on the main memory 31, and the address translation table supportable by a process (or the OS) running on the CPU core 12 at the timing of the context switching etc can be loaded into the MMU 15.

Upon acquiring the physical address, the entry associated with the physical address is searched for in a way that refers to the segment information management table shown in FIG. 5. For instance, if the physical address "effffff" is obtained from the MMU 15, it is known by referring to the table in FIG. 5 that this physical address belongs the segment 7, and the segment 7 is in the sleep state. In the case of the sleep state, a command of changing the power state of the segment to the active state is transmitted to the memory module 101, a command of accessing (writing or reading) the memory module 101 is thereafter sent, and hereafter a command of changing the power state of the segment to the sleep state is transmitted to the memory module 101.

The "access count" field in the table of FIG. 5 is stored with a value of $S_i(\ )$ described above, and the value is incremented by "1" per access. For example, if a certain set of data is written H-times dividedly, a value "H" is added to the access count at this time. The MMU 15 or the CPU core 12 or another unit may increment the access count.

Further, the "access frequency" field is stored with $F_i(\ )$ described above. The OS calculates the access frequency by use of the mathematical expression 2 with a timer interrupt at every time interval T, and, further, clears the access count in the table of FIG. 5 down to zero. Moreover, if the segment with the access frequency being smaller than the predetermined power state determining threshold value is in the active state, the command of setting this segment in the sleep state is issued to the memory module 101. If the segment with the access frequency being equal to or larger than the predetermined power state determining threshold value is in the sleep state, the command of setting this segment in the active state is issued to the memory module. With respect to the segment of which the power state (the sleep or active state) does not vary, there is no necessity for issuing the command.

Thus, the segment with the small access frequency is set in the sleep state, whereby the power consumption of the memory can be reduced. Furthermore, the access to the sleep segment needs to be made after changing the power state of the segment to the active state, resulting in the elongated access delay. Since the segment with the small access frequency is set in the sleep state, it is feasible to reduce influence of the elongated access delay on the processing speed of the computing machine.

Next, such a case is considered that the computing machine is booted from an S5 status of ACPI (Advanced Configuration and Power Interface).

The S5 status of ACPI is a status of transitioning due to a shutdown operation as termed on the Windows platform, in which the execution status kept so far is not retained. In the case of booting from S5, in the segment information management table in FIG. 5, initial values of the access count and the access frequency are each "0". Such being the case, when booted from S5, it is desirable to set active the power states of all of the segments and to set the power state based on the access frequency at the predetermined timing (e.g., a timing with an elapse of a fixed period of time after completing booting). The processing performance can be thereby prevented from declining when booting with a comparatively large number of memory accesses.

[Variations of Changing Power State of Segment]

The description has been made so far by exemplifying the case in which the CPU core issues the command of changing the power state of the segment to the memory module; however, any inconvenience may not be caused by the MMU 15 issuing this command. Moreover, it is also practicable that the memory module 101 retains the segment information management table, and, with the access count and the access frequency being calculated, the power state of the segment is changed within the memory module 101.

[Memory Allocation and Memory Deallocation]

Figure 6:
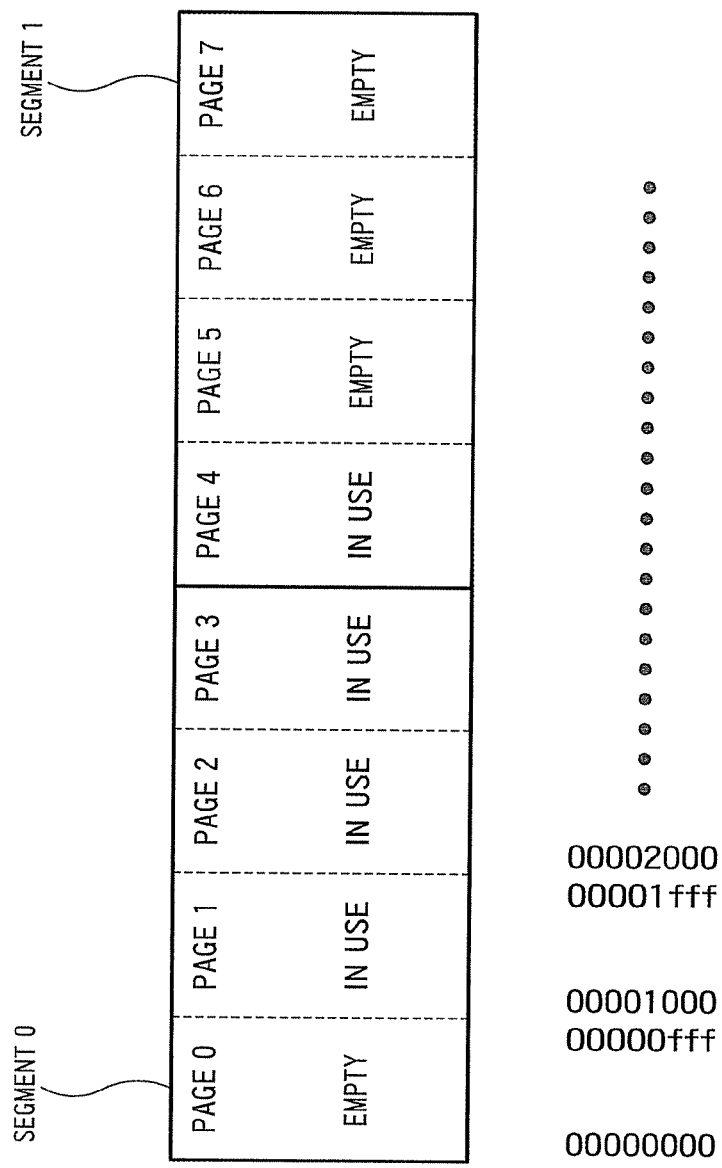
FIG. 6 is a diagram illustrating one example of a status of how a physical memory is used.

The process or the OS requires the memory, in which case the OS allocates (ensures) the physical page, determines the associated logical address and writes this address to the address translation table. FIG. 6 is a diagram illustrating simulatively how the physical memory is used.

Four physical pages are provided on a per segment basis, in which the page 0 is a segment area ranging from an address "00000000" to an address "00000fff", and the page 1 is a segment area ranging from an address "000001000" to an address "00002fff" (a page size is 4 KB). The pages 1, 2, 3 and 4 are already allocated in the memory and are used underway, while the remaining pages are empty (not yet used).

The OS, if required to newly allocate (ensure) a memory, allocates (ensures) the page having the smallest address among the empty pages. The arrangement being thus done, the empty pages can be aggregated in the segment area having the larger address, and such a chance rises that the segment specified by the large addresses can be set in the sleep state. Then, in the address translation table, it is described how the logical addresses are associated with the physical addresses.

In the case of deallocating (freeing) the memory, the relevant segment area in the address translation table is deleted (or alternatively the attribute value of the entry of the relevant segment area is changed to a not-yet-used status).

[Configuration of Memory Module]

Figure 11:
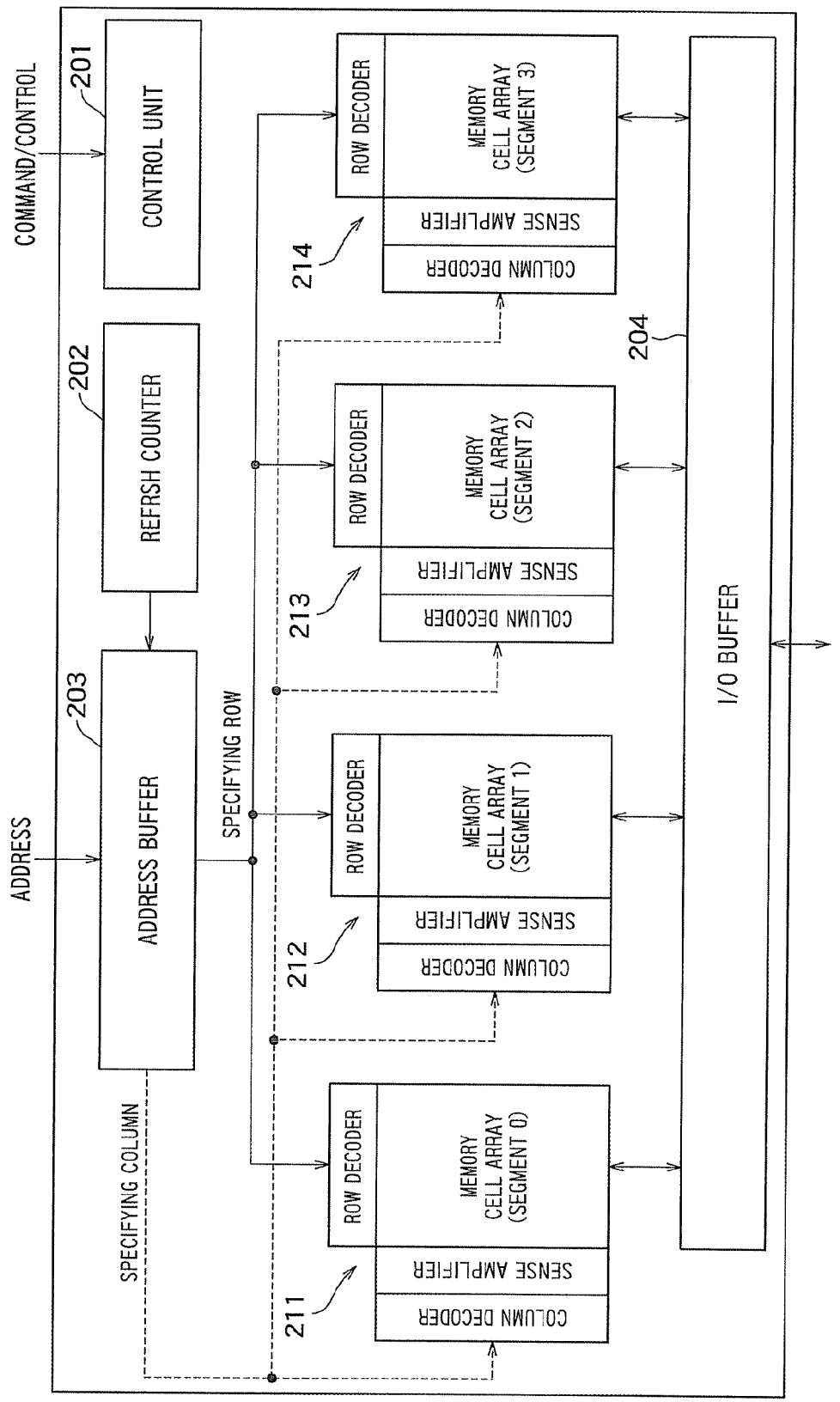
FIG. 11 is a diagram showing an example of another configuration of the memory module.

FIG. 11 is a diagram of the configuration of the memory module 101. FIG. 11 illustrates a configuration example based on a 4-segment configuration. The memory module 101 includes a control unit 201, a refresh counter 202, an address buffer 203, an I/O buffer 204 and four pieces of memory cell array units 211, 212, 213, 214. Each of the memory cell array units includes a memory cell array, a row decoder, a column decoder and a sense amplifier.

The control unit 201 receives a command or a control instruction from outside and controls internal components of the memory module according to the command or the control instruction. The change of the power state with the segment being specified is given by way of an example of the control.

The refresh counter 202 is what is required in the case of the DRAM and indicates a refresh target cell and a timing when performing the refresh operation so that the contents retained by the memory do not become volatile.

The address buffer 203 receives the physical addresses from outside, then divides these addresses into column addresses and row addresses, and transmits these column and row addresses to the column decoder and the row decoder. At this time, it is desirable that the address buffer 203 derives the associated segment from the received address and transmits the column address and the row address to only the thus-derived segment. The column decoder and the row decoder, which receive the column address and the row address respectively, read a value of the memory cell (in the case of the read command) specified by these addresses, and transmit the memory cell value to the I/O buffer 204.

The sense amplifier amplifies signals when reading the information retained in the memory cell.

The memory cell array is configured to include a plurality of memory cells and retains the information.

The I/O buffer 204 temporarily accumulates the data transmitted to and received from the memory cell array.

Figure 13:
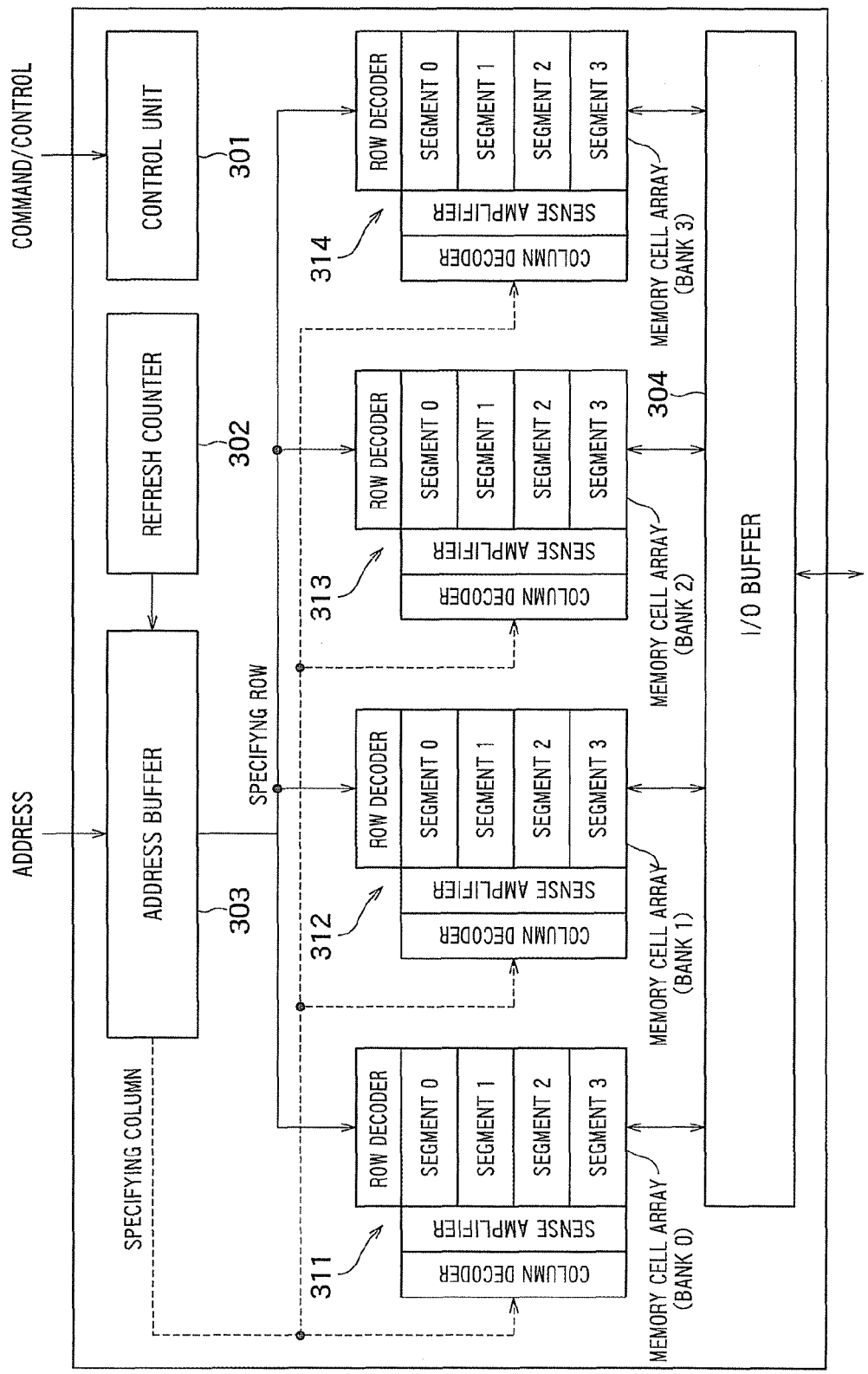
FIG. 13 is a diagram showing an example of still another configuration of the memory module.

FIG. 13 shows another example of the configuration of the memory module.

In FIG. 13, each of banks (memory cell arrays) 311, 312, 313, 314 is divided into the segments in a 4-bank configuration. It is desirable that the CPU associates the physical addresses with the memory addresses as follows. Herein, MSB (Most Significant Bit) is given on the column address side rather than the row address side. A "transfer unit" represents a bit count of the data that is read and written at one access. A "channel" indicates a memory channel number. The "bank" indicates a bank number. A "DIMM number" of the same channel indicates the number for identifying each DIMM connected to the same channel.

| Column Address | DIMM-Number of Same Channel | Bank | Row Address | Channel | Transfer Unit |
|---|---|---|---|---|---|

With this contrivance, the memory access can be, especially when the transfer unit is large, speeded up by accessing the memory and switching over the banks with respect to the same row of the memory cell array. Moreover, as depicted in FIG. 3, the continuous areas are specified by the physical addresses in the segments, and hence, even when the transfer unit is large, such an effect is yielded that an access over to the plurality of segments is hard to occur. This effect becomes valid by setting the column address on the MSB side rather than the row address also in the configuration of the memory module in FIG. 11.

[Example of Configuration]

Figure 14:
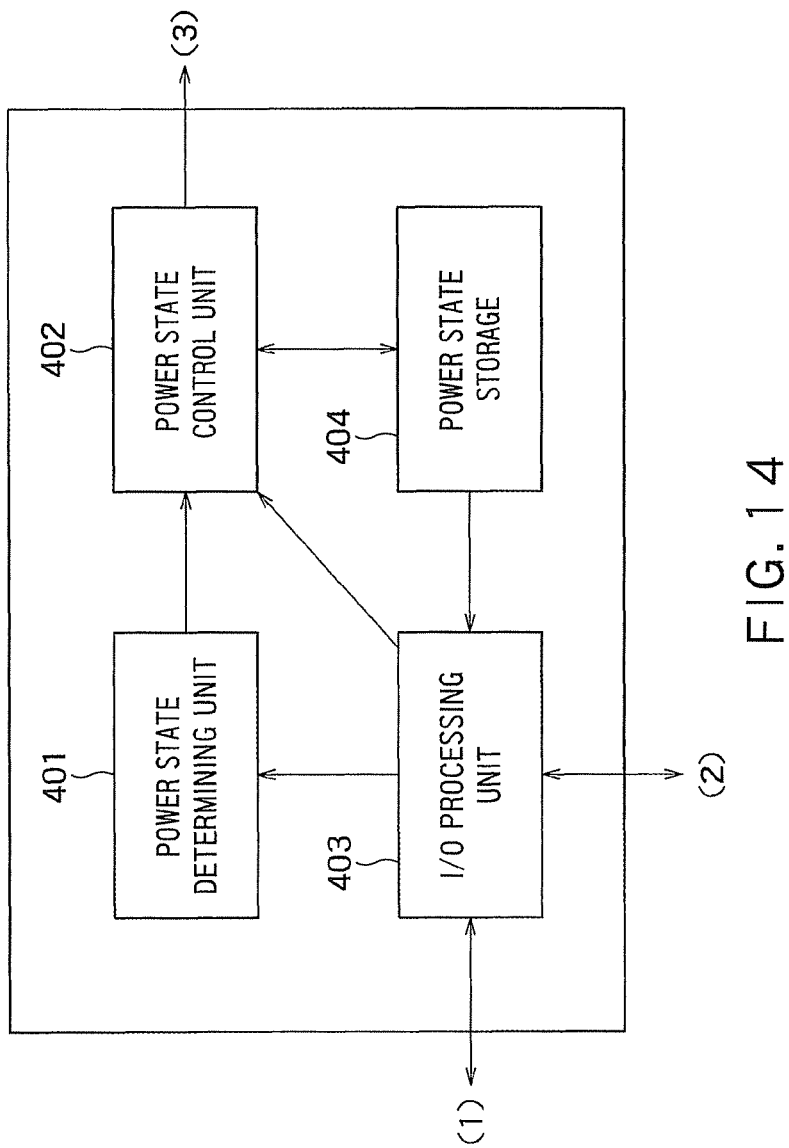
FIG. 14 is a diagram showing an example of a configuration of a computation processing apparatus according to the first embodiment.

FIG. 14 shows an example of a configuration of a computation processing apparatus according to the present embodiment.

The computation processing apparatus illustrated in FIG. 13 includes a power state determining unit 401, a power state control unit 402, an I/O processing unit 403 and a power state storage 404. Functions of respective blocks can be realized by executing a program containing program commands describing the executions of these functions or by hardware or by combining the software and the hardware.

Some of these functions may be incorporated into hardware different from the CPU core 12. This different hardware may be packaged on the memory module or the memory chip. The program described above may be stored on a non-transitory computer readable recording medium and executed by its being read from the recording medium.

As depicted in FIG. 14, the I/O processing unit (which is normally the CPU), when receiving the memory access request from outside (normally the OS) ((1)), transmits the address contained in this request to the power state determining unit 401, and obtains the power state of the segment containing this address from the power state storage 404. If this power state is the sleep state, the I/O processing unit requests the power state control unit 402 to set this segment in the active state and thereafter executes reading or writing the data in accordance with the memory access request ((2)). Whereas if the power state is the active state, the I/O processing unit requests the power state control unit 402 to return the segment to the sleep state.

Herein, if the memory access request is a read request, this read request contains the address information. A response from the memory contains the data information retained so far in the specified address in the memory. Furthermore, if the memory access request is a write request, the write request contains the address information and the data information that should be written. The response from the memory contains an event which notifies of completion of writing.

The power state determining unit 401 calculates the access load on the memory and determines the power state of each segment corresponding to the access load. In the case of the first embodiment, when receiving the address from the I/O processing unit 403, the access count of the segment, to which this address belongs, is incremented. Further, the access frequency is calculated based on the access count at every time interval T, and the power state (the sleep state or the active state) of each segment is determined based on the derived access frequency. The power state determining unit 401 transmits the thus-determined power state of the segment to the power state control unit 402.

The power state control unit 402, upon receiving the power state of the segment from the power state determining unit 401, compares the received power state with the present power state retained in the power state storage 404. If required to make a change, the power state is changed ((3)), and a new power state is set in the power state storage 404.

The power state storage 404 is stored with the power states of the respective segments.

In the configuration illustrated in FIG. 14, it is considered that the segment information storage table in FIG. 5 is shared and retained between the power state storage 404 and the power state determining unit 401.

[Remarks]

Thus, in the first embodiment, the access load such as the memory access frequency per segment is calculated, and the power state of the segment is controlled based on this access load. The first embodiment can be modified in a variety of forms and can be carried out even in, e.g., a computer architecture not including the MMU.

Moreover, in the first embodiment, the description has been made by exemplifying the page-formatted memory management method; however, the present invention can be also applied to a memory management method using a segmentation format.

Further, in the first embodiment, the OS calculates the access load such as the memory access frequency, and transmits the request for changing the power state on the basis of this access load to the memory module. Another configuration is that the memory module calculates the access load (e.g., measures the access count and calculates the access frequency), and this memory module itself can change the power state of the segment. In this case, the memory module, when detecting the memory access to the sleep segment, changes the power state of this segment to the active state, and, after processing the access, makes the segment transition to the sleep state.

Moreover, in the first embodiment, the OS calculates the access load such as the memory access frequency, and transmits the request for changing the power state on the basis of this access load to the memory module. Another configuration is that a program such as a Daemon process running in a user space may perform these operations. Alternatively, this can be realized not by the softwarewise CPU process but by a hardwarewise process differently.

In the first embodiment, the description has been made on the assumption that the memory has the two types of power states, i.e., the active state and the sleep state; however, the memory can have three or more power states. For example, the readable/writable states are classified into a first active state and a second active state. The first active state is larger in power consumption but smaller in access delay than the second active state. This relationship therebetween can be realized by, e.g., setting the first active state larger in any one or both of the memory internal clock or refresh rate than the second active state. If the access frequency $Fi(\ )$ of the segment in the first active state is smaller than a certain threshold value, the segment is set in the second active state. As a matter of course, if the access frequency is much smaller (if the access frequency is smaller than another threshold value smaller than a certain threshold value given above), it is desirable that the segment is set in the sleep state.

Furthermore, a read/write-disabled state with respect to the memory can be classified into a plurality of states. For instance, this read/write-disabled state is classified into a first sleep state and a second sleep state. The first sleep state can be defined to be larger in power consumption but smaller in delay for attaining the active state than the second sleep state. This relationship can be realized by a size of circuit portions which stop being supplied with the electric power in the access circuit. For example, the relationship can be actualized such that the first sleep state is a state where the circuits other than the PLL stop being supplied with the electric power in the access circuit, and the second sleep state is a state where the majority of circuits including the PLL stop being supplied with the electric circuit in the access circuit. If the access frequency $Fi(\ )$ of the segment in the second sleep state is larger than a certain threshold value, the segment is set in the first sleep state. As a matter of course, if the access frequency is much larger (if the access frequency is equal to or larger than another threshold value larger than a certain threshold value given above), it is desirable that the segment is set in the active state.

In the first embodiment, the access frequency is calculated without making any distinction between reading and writing; however, the read access frequency and the write access frequency are calculated, and the power state can be also set based on these calculated access frequencies. For example, when the read access frequency is smaller than the threshold value, the circuit is configured so that the power consumption of the memory is decreased by enlarging the access delay against reading with respect to the power state of the segment. Moreover, when the write access frequency is smaller than the threshold value, a contrivance is that the power consumption of the memory is decreased by enlarging the access delay against writing with respect to the power state of the segment. In these cases, it is desirable that the power state for reading and the power state for writing are handled independently and simultaneously.

The present invention can be applied to a nonvolatile memory such as the MRAM other than the nonvolatile memory like the DRAM. In this instance, the power consumption in the sleep state can be reduced to a greater degree, which is therefore further preferable. Moreover, the present invention is also applicable to the computing machine using the plural types of memories such as the DRAM and the MRAM.

(Second Embodiment: Addition of Page Swapping to First Embodiment)

The first embodiment has exemplified the method of controlling the power state on the segment-by-segment basis. A second embodiment will exemplify a technique of further increasing the chance for sleeping the segment by changing the segment to which the page belongs, correspondingly to the access frequency to the page.

Note that the architecture of the computing machine and the configuration of the memory module in the second embodiment are the same as those in the first embodiment, and therefore their redundant explanations are omitted. Moreover, the multiple variations described in the first embodiment can be also applied to the second embodiment.

[Outline of Operating Principle]

The memory access is believed to have time locality (which means that a memory address once accessed undergoes accessing again within a short period of time) and a spatial locality (which means that a memory neighboring to the memory address once accessed undergoes accessing frequently (in which the memory address is defined as the logical address)). If the memory segment areas accessed frequently can be aggregated at the specified segment by some sort of means, it can be expected that a much larger number of segments can be set in the sleep state.

Let $\lambda_H$ be the access frequency to the active segment, let $\lambda_L$ be the access frequency to the sleep segment, and let $N_H$, $N_L$ be the segment count of the active segments and the segment count of the sleep segments, respectively. The access frequency $N\lambda$ to the whole memory is given by $N\lambda=\lambda_H N_H+\lambda_L N_L$. A total of the segments is given by $N=N_H+N_L$. At this time, the power consumption of the memory can be obtained as below.

$$P = N_H P_{active} + N_L P_{sleep} \qquad \text{[Mathematical Expression 3]}$$
$$= N_H(P_a + P_{rw}\lambda_H) +$$
$$N_L\{P_s + (P_{sa} + P_{as} + P_{rw})\lambda_L\}$$
$$= P_{rw}N\lambda + N_H P_a +$$
$$N_L\{P_s + (P_{sa} + P_{as})\lambda_L\}$$
$$= P_{rw}N\lambda + NP_a -$$
$$N_L\{P_a - P_s - (P_{sa} + P_{as})\lambda_L\}$$

It is understood from the mathematical expression 3 that if values of N and A are fixed, the power consumption becomes smaller as $N_L$ becomes larger and also gets smaller as $N_L\lambda_L$ gets smaller. Namely, the power consumption becomes smaller as the sleep segment count is larger and the access frequency to the whole of the sleep segments is smaller.

The power consumption can be reduced by concentrating the accesses at the specified segment in a way that exploits the empirical rule given as the locality of the memory access.

[Details of Operation of OS]

Page replacement is conducted in order to exploit the locality of the memory access. The "page replacement" is defined as an operation of shifting, when the access to a certain page occurs and in anticipation of the occurrence of a good number of accesses to within this page thereafter, this page to the segment exhibiting the high access frequency.

[Page Replacement Algorithm]

When the CPU core 12 executes accessing the logical address, the physical address is detected by use of the address translation table of the MMU 15 (which is the same as in the first embodiment). Further, it is checked by referring to the segment information management table (see FIG. 5) whether this physical address exists in the sleep segment or the active segment. If existing on the sleep segment, this segment is made to transition to the active state, and the page containing this physical address is replaced with a page on another active segment. Then, the post-replacement page in another active segment is accessed, and the segment undergoing the transition to the active state is returned to the sleep state.

Figure 8:
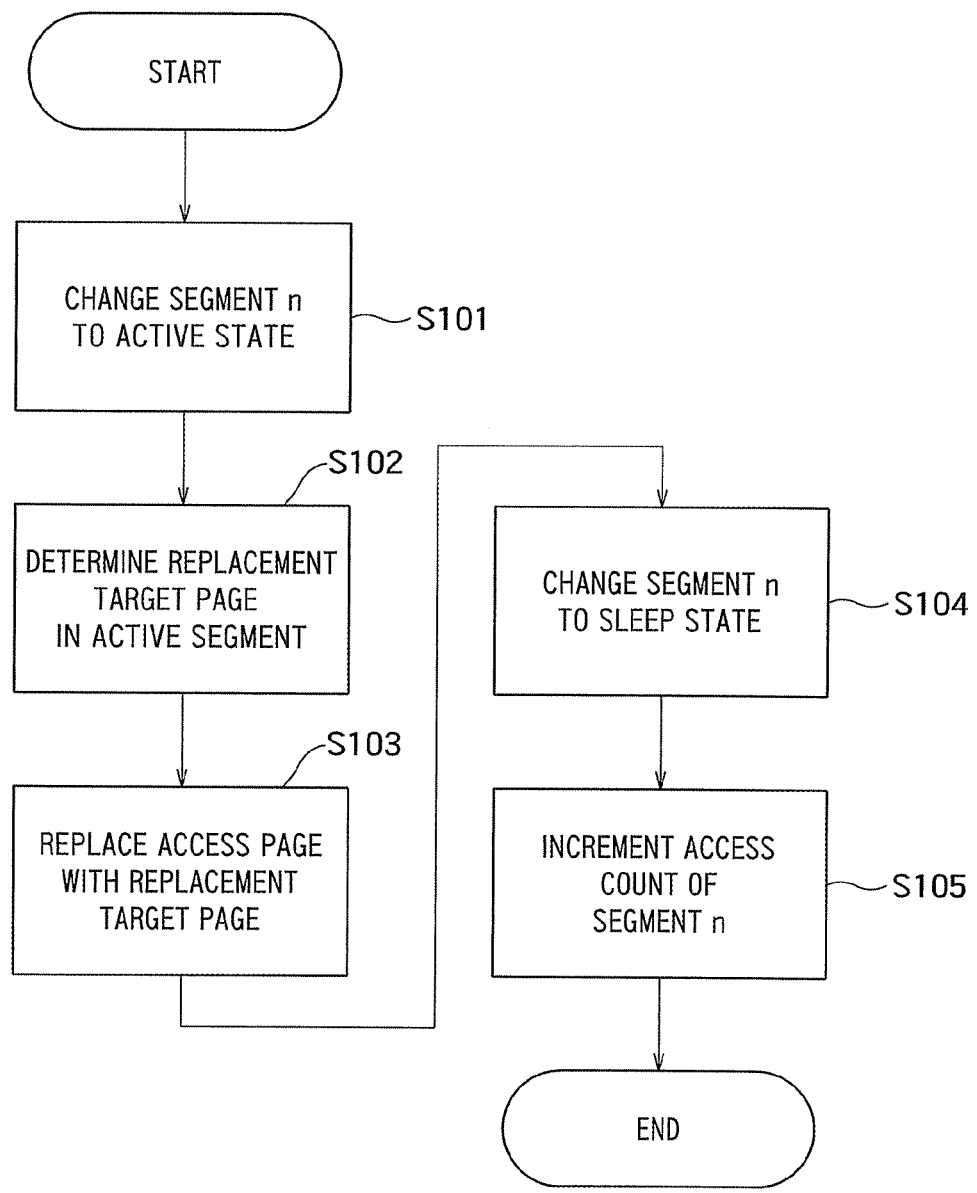
FIG. 8 is a flowchart showing one example of a processing flow according to a second embodiment.

FIG. 8 shows a flowchart of this process. The present processing flow represents the process in such a case that after translating the logical address into the physical address, this physical address exists in the segment n.

The power state of the segment n is changed to the active state (S101), and, in a segment different from the segment n, a page (replacement target page) replaced with the page (access page) containing the physical address is determined (S102). The access page is replaced with the replacement target page (S103). The segment n is returned to the sleep state (S104), and the access count of the segment n is incremented (S105).

Herein, the phrase "replacing the access page with the replacement target page" implies rewriting the data of the address translation table as well as replacing the storage location on the memory.

A specific example of this process will be described by use of FIG. 10.

In FIG. 10(a), a logical page 0 is associated with a physical page 1; a logical page 1 is associated with a physical page 2; a logical page 2 is associated with a physical page 4; and a logical page N is associated with a physical page 17. There is an access to an address belonging to the logical page 2 (i.e., the physical page 4), and the replacement target page is the physical page 2, in which case the items of information retained on the physical page 2 and on the physical page 4 on the memory are replaced with each other (the data on the physical page 2 is transferred onto the physical page 4, and the data on the physical page 4 is transferred onto the physical page 2).

Further, as in FIG. 10(b), in the address translation table, an entry associated with the logical page 1 is replaced with an entry associated with the logical page 2. With this replacement, the data retained so far on the logical page 1 are transferred from the physical page 2 to the physical page 4 but still exist on the logical page 1 owing to the replacement in the address translation table. Therefore, the program, which accesses the memory through the logical address, has no necessity for being aware of this page replacement.

Herein, a variety of methods are considered as a method of detecting the page to be replaced. For instance, a method called an LRU (Lease Recently Used) page replacement algorithm can be employed. According to this method, the page with the latest access occurring in the earliest past is selected from the pages on the active segments and is replaced with the access page. As a matter of course, it is desirable that an empty page existing, if any, on the active segment is set as the replacement target page.

Moreover, the replacement target page can be also determined by use of an algorithm called an NFU (Not Frequently Used) algorithm. In the NFU algorithm, the access frequency is retained on a page-by-page basis, and the page exhibiting the smallest access frequency is selected as the replacement target page. Then, the replacement target page is transferred into the sleep segment.

There exist a variety of algorithms deriving from the NFU algorithm. For example, an aging method is that information on whether the access occurs or not is recorded at every a certain time interval (e.g., 10 msec) called a tick, and the recording segment areas thereof are prepared for 10 ticks. With this preparation, the information per tick on whether the access to each page occurs or not can be known for 10 ticks in the past. If there is the access to the page on the sleep segment, the page with the latest access being old on the active segment is detected and replaced.

The algorithms for selecting the replacement target page are, in addition to those given above, exemplified such as a FIFO (First In, First Out) algorithm, a second chance algorithm, a clock algorithm, a working set algorithm and a WSClock algorithm (the details are described in "Modern Operating Systems", 2nd edition of the original, authored by Andrew S. Tanenbaum, published by Pearson Education Corp.).

Thus, the use of the page replacement algorithm enables the segments to be divided into the segments with the high access frequency and the segments with the low access frequency by exploiting the locality of the memory access and enables the chances for sleeping the segments to be increased.

[Determination of Sleep Segment Count]

When the CPU has the access by use of the logical address, the physical address is searched for from the address translation table, and the segment information is obtained from the segment information translation table (see FIG. 5), thus accessing the physical memory. On this occasion, the access count to the relevant segment is incremented.

The OS calculates the access frequency by use of the mathematical expression 2 with a timer interrupt at every time interval T, and clears the access count down to zero.

In the sleep segment, if the access frequency is larger than a power state determination threshold value $\lambda_{sleep}$, this sleep segment is set active. On this occasion, it is desirable that an upper limit is set in the sleep segment count of the sleep segments that are changed to the active state for a certain fixed period of time. Specifically, the power state of only one segment at the maximum can be changed at every time interval T.

Moreover, in the active segment, if the access frequency is smaller than a power state determination threshold value $\lambda_{active}$, this active segment is set sleeping. On this occasion, it is desirable that an upper limit is set in the active segment count of the active segments that are changed to the sleep state for a certain fixed period of time. Specifically, the power state of only one segment at the maximum can be changed at every time interval T. It is desirable to establish a relation between these threshold values such as $\lambda_{active} < \lambda_{sleep}$.

Herein, the values, which differ on the segment-by-segment basis, can be also used as the threshold values $\lambda_{active}$ and $\lambda_{sleep}$. A specific example can be given, in which the values are changed corresponding to the power characteristics and the access characteristics (such as the power consumption required for accessing, the power consumption needed for the sleep state, the power consumption needed for the active state and the time expended for changing the power state) with respect to the segment.

Furthermore, it is feasible to change $\lambda_{active}$ and $\lambda_{sleep}$ corresponding to the elapsed time since the power state has been changed most recently. To be specific, the setting of not changing the power state as the elapsed time becomes shorter enables prevention of an excessive change of the power state.

Figure 9:
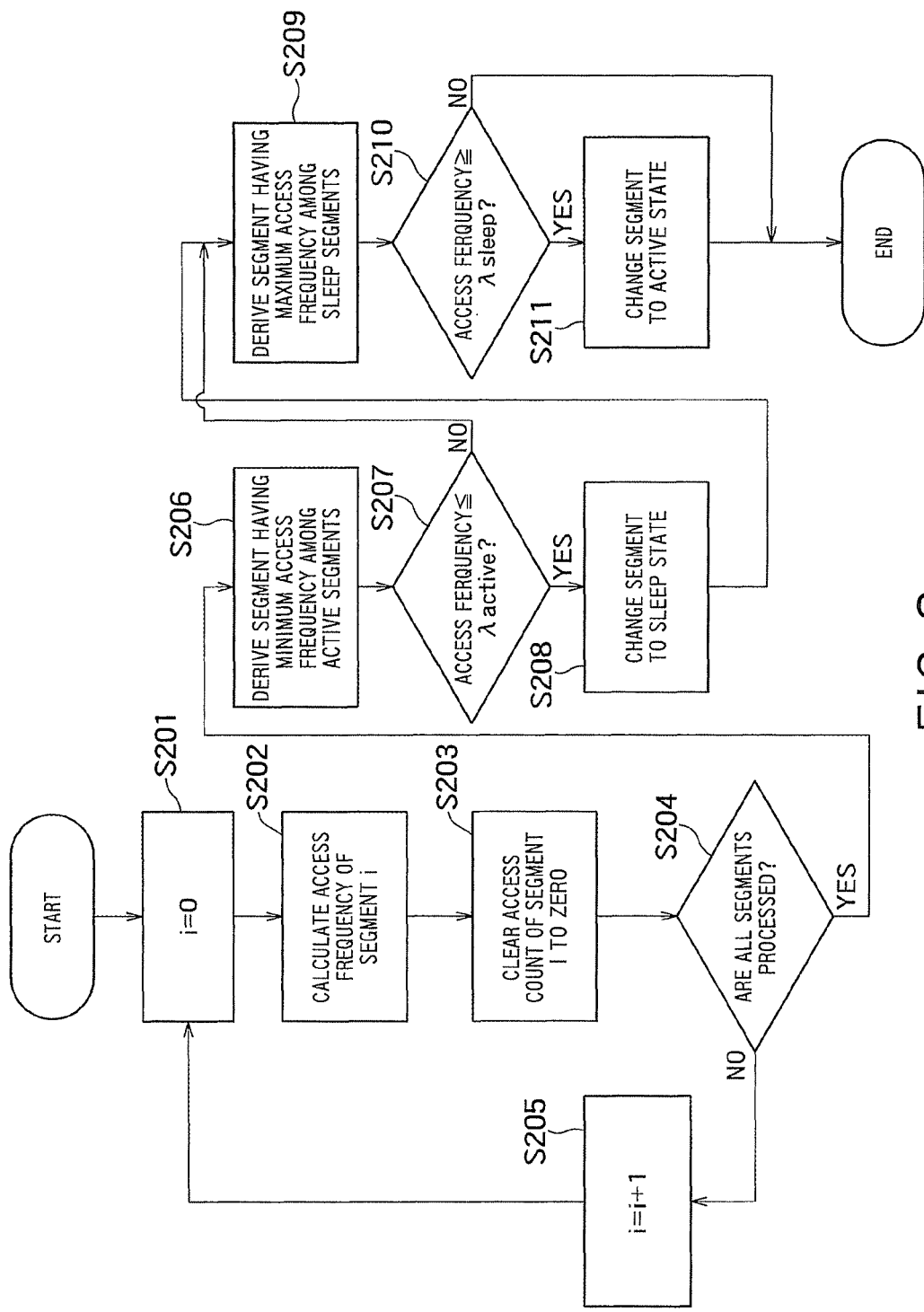
FIG. 9 is a flowchart showing another example of the processing flow according to the second embodiment.

FIG. 9 illustrates a process in a case where the power state of one sleep segment at the maximum is changed to the active state at every time interval T, and the power state of one active segment at the maximum is changed to the sleep state.

To begin with, a parameter variable i is set by i=0 (S201), then the access frequency of the segment i is calculated (S202), and access count of the segment i is cleared down to zero (S203). The processes in S202, S203 are executed about all of the segments (S204, S205).

The segment having the minimum access frequency among the active segments is specified (S206). It is determined whether the access frequency of the specified segment is equal to or smaller than $\lambda_{active}$ (S207). If equal to or smaller than $\lambda_{active}$, the power state of the segment is changed to the sleep state (S208), and the processing advances to step S209. Whereas if larger than $\lambda_{active}$, the processing diverts to step S209.

Next, the segment having the maximum access frequency among the sleep segments is specified (S209). It is determined whether the access frequency of the specified segment is equal to or larger than $\lambda_{sleep}$ (S210). If equal to or larger than $\lambda_{sleep}$, the power state of the specified segment is changed to the active state (S211), and this processing comes to an end. Whereas if smaller than $\lambda_{sleep}$, the processing is finished.

By way of a modified example of the present algorithm, the sequential orders about the power states are given to the segments beforehand, and the power state can be also determined corresponding to the sequential order and the access frequency. The phrase "giving the sequential orders" implies applying such a restriction that the segment i can be set in the active state only when the segments i–1, i–2, . . . 0 are in the active state, and the segment i can be set in the sleep state only when the segments i–1, i–2 . . . , are in the sleep state. It is desirable that the smaller sequential order is assigned to the segment exhibiting the smaller power consumption in the active state. Alternatively, it is desirable that the larger sequential order is assigned to the segment exhibiting the smaller power consumption in the sleep state. Further alternatively, it is desirable that the smaller sequential order is assigned to the segment exhibiting the smaller access delay in the active state. Still alternatively, it is desirable that the smaller sequential order is assigned to the segment exhibiting a larger cost (the transition time or the power consumption) required for the transition from the sleep state to the active state. It is desirable that these sequential orders are determined depending on whether the memory is realized by the DRAM or the MRAM or depending on a distance of the electric connection between the CPU and the memory. The following is a specific description.

An assumption is that the signal line for transmitting the column address is shortest between the address buffer 203 and the segment 0 and is longest between the address buffer 203 and the segment 3. Supposing that the power consumption for driving the address line is larger as the address line is longer, it is desirable that the segment exhibiting the larger power consumption is kept in the sleep state as long as possible. For example, it is desirable in terms of the sequential order of the segment described above that the sequential order of the segment is set larger as the cell array has the larger power consumption.

Moreover, as illustrated in FIG. 2, if the single memory chip is configured to include the plurality of memory chips 102, for instance, the larger sequential order is assigned to the segment as the cell array of the memory chip is disposed at more rightward end in FIG. 2, whereby the accesses to the cell array with the large delay of the access can be reduced. Moreover, there is a case in which even if the sleep segment count is the same within the memory module, the effect in reducing the power consumption is higher by concentrating the sleep segments on the single chip than by dispersing the sleep segments between the chips. For instance, when all of the segments within one memory chip get into the sleep state, the power consumption reducing effect rises. In this case, it is desirable that the consecutive segment sequential orders are assigned to the segments within the memory chip and between the memory chips. For example, when considering the memory module mounted with the four memory chips, it is desirable that the segment 0 and the segment 1 are disposed within the memory chip 0; the segment 2 and the segment 3 are disposed within the memory chip 1; the segment 4 and the segment 5 are disposed within the memory chip 2; and the segment 6 and the segment 7 are disposed within the memory chip 3.

Furthermore, when the computing machine includes the plurality of memory modules, there is a case in which even if the sleep segment count is the same within the computing machine, the power consumption reducing effect is higher by concentrating the sleep segments on the single memory module than by dispersing the sleep segments between the memory modules. For instance, when all of the segments within one memory module get into the sleep state, the power consumption reducing effect rises. In this case, it is desirable that the consecutive segment sequential orders are assigned to the segments within the memory module and between the memory modules. For instance, in the case of including the two memory modules, it is desirable that the segment 0 and the segment 1 are disposed on the memory module 0; and the segment 2 and the segment 3 are disposed within the memory module 1.

Moreover, it is assumed that the computing machine includes the plurality of memory modules, a certain memory module (or a semiconductor having the memory function) exists on the same LSI package as the CPU exists, and another memory module is realized on another package. At this time, it can be expected that the accesses to the memory modules within the same package can be realized at the low power consumption with the small access delay. It is therefore desirable that more of the memory modules within the same package become the active state. Namely, it is desirable that less of the sequential orders are assigned to the segment.

Figure 7:
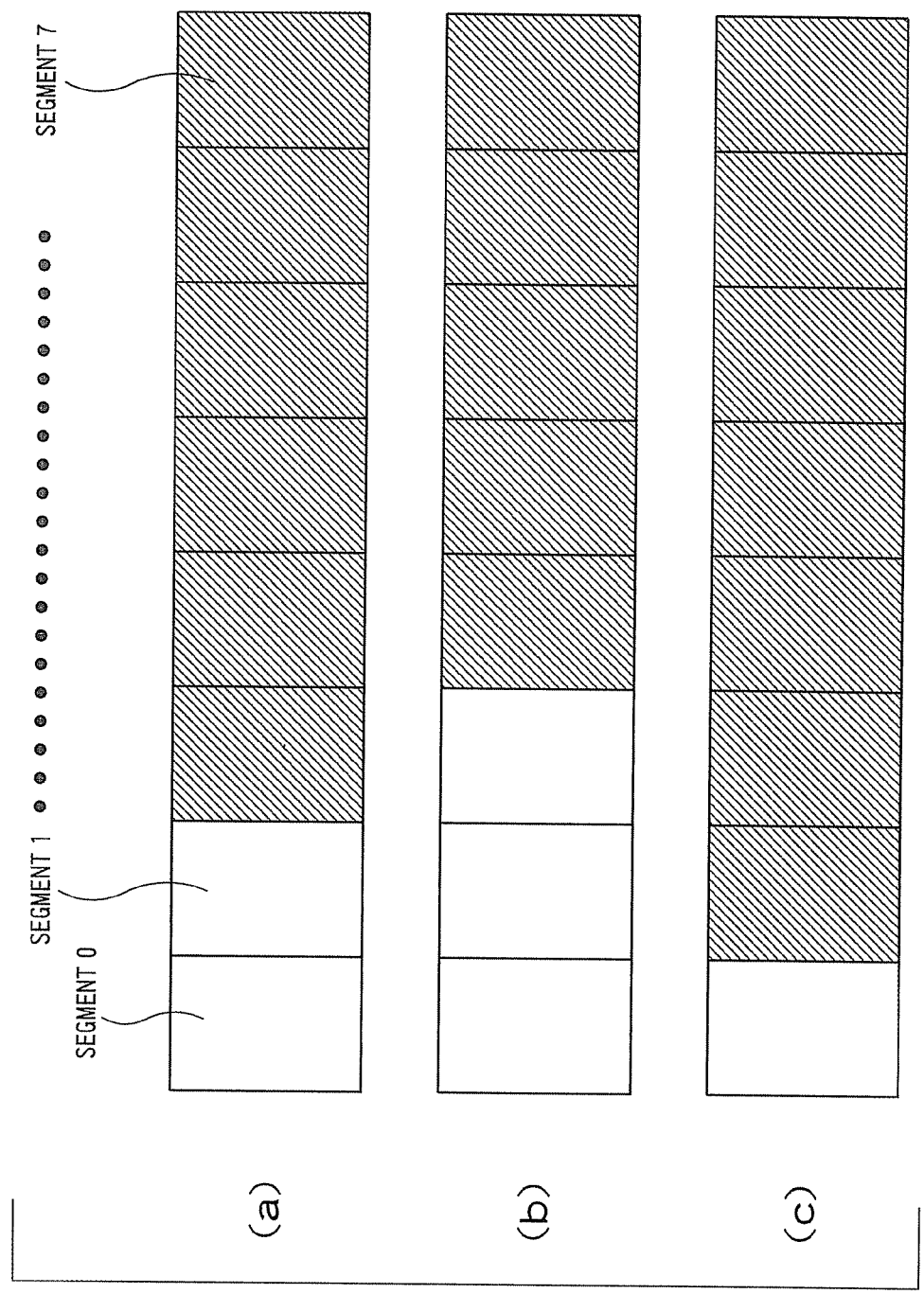
FIG. 7 is a diagram illustrating an example of applying a restriction to a sequential order with respect to a power state of a segment.

FIG. 7(*a*) is a diagram illustrating the physical memory simulatively. Void segments (the segments 0, 1) are in the active state, and segments (the segments 2-7) with hatchings are in the sleep state. The access frequency of each segment is calculated at every time interval T, and a sleep segment count is determined based on the following procedures (items).

1. If the active segment with the access frequency being equal to or smaller than $\lambda_{active}$ exists and whereas if the sleep segment with the access frequency being equal to or larger than $\lambda_{sleep}$ does not exist, the sleep segment count is incremented by 1 (a change from FIG. 7(*a*) to FIG. 7(*c*)).

2. If the active segment with the access frequency being equal to or smaller than $\lambda_{active}$ does not exist and whereas if the sleep segment with the access frequency being equal to or larger than $\lambda_{sleep}$ exists, the sleep segment count is decremented by 1 (a change from FIG. 7(*a*) to FIG. 7(*b*)).

3. If the active segment with the access frequency being equal to or smaller than $\lambda_{active}$ does not exist and whereas if the sleep segment with the access frequency being equal to or larger than $\lambda_{sleep}$ does not exist, the sleep segment count is not changed.

4. If the active segment with the access frequency being smaller than $\lambda_{active}$ exists and whereas if the sleep segment with the access frequency being larger than $\lambda_{sleep}$ exists, the sleep segment count is not changed.

Although the sleep segment count is not changed in the item (procedure) 4, that can be also incremented in a way that gives the priority to the power consumption. Alternatively, the sleep segment count can be also decremented in a way that gives the priority to the processing performance.

[Variations of Changing Power State of Segment]

The description has been made so far by exemplifying the case in which the CPU core issues the command of changing the power state of the segment to the memory module; however, any inconvenience may not be caused by the MMU 15 issuing this command.

Moreover, it is also practicable that the memory module retains the segment information management table, and, with the access count and the access frequency being calculated within the memory module, the power state of the segment is changed within the memory module as well as conducting the page replacement. In this case, the memory module retains the same translation table as the address translation table in FIG. 10 separately from the MMU 15, and the CPU maintains the associative relation between the physical address for accessing the memory and the internal address of the memory module. With this contrivance, the CPU needs not to be aware of the page replacement by concealing the page replacement within the memory module.

[Memory Allocation and Memory Deallocation]

The process or the OS requires the memory, in which case the OS allocates the physical page, determines the associated logical address and writes this address to the address translation table. FIG. 6 is the diagram illustrating simulatively how the physical memory is used.

Four physical pages are provided on the per segment basis, in which the page 0 is the segment area ranging from the address "00000000" to an address "00000fff", and the page 1 is the segment area ranging from the address "000001000" to the address "00002fff" (the page size is 4 KB). The pages 1, 2, 3 and 4 are already allocated in the memory and are used underway, while the remaining pages are empty (not yet used).

The OS, if required to newly allocate (ensure) the memory, allocates the page having the smallest address among the empty pages. The arrangement being thus done, the empty pages can be aggregated in the segment area having the larger addresses, and such a chance rises that the segment specified by the large addresses can be set in the sleep state. Then, in the address translation table, it is described how the logical addresses are associated with the physical addresses.

In the case of deallocating the memory, the relevant segment area in the address translation table is deleted (or alternatively the attribute value of the entry of the relevant segment area is changed to a not-yet-used status).

[Example of Configuration]

Figure 15:
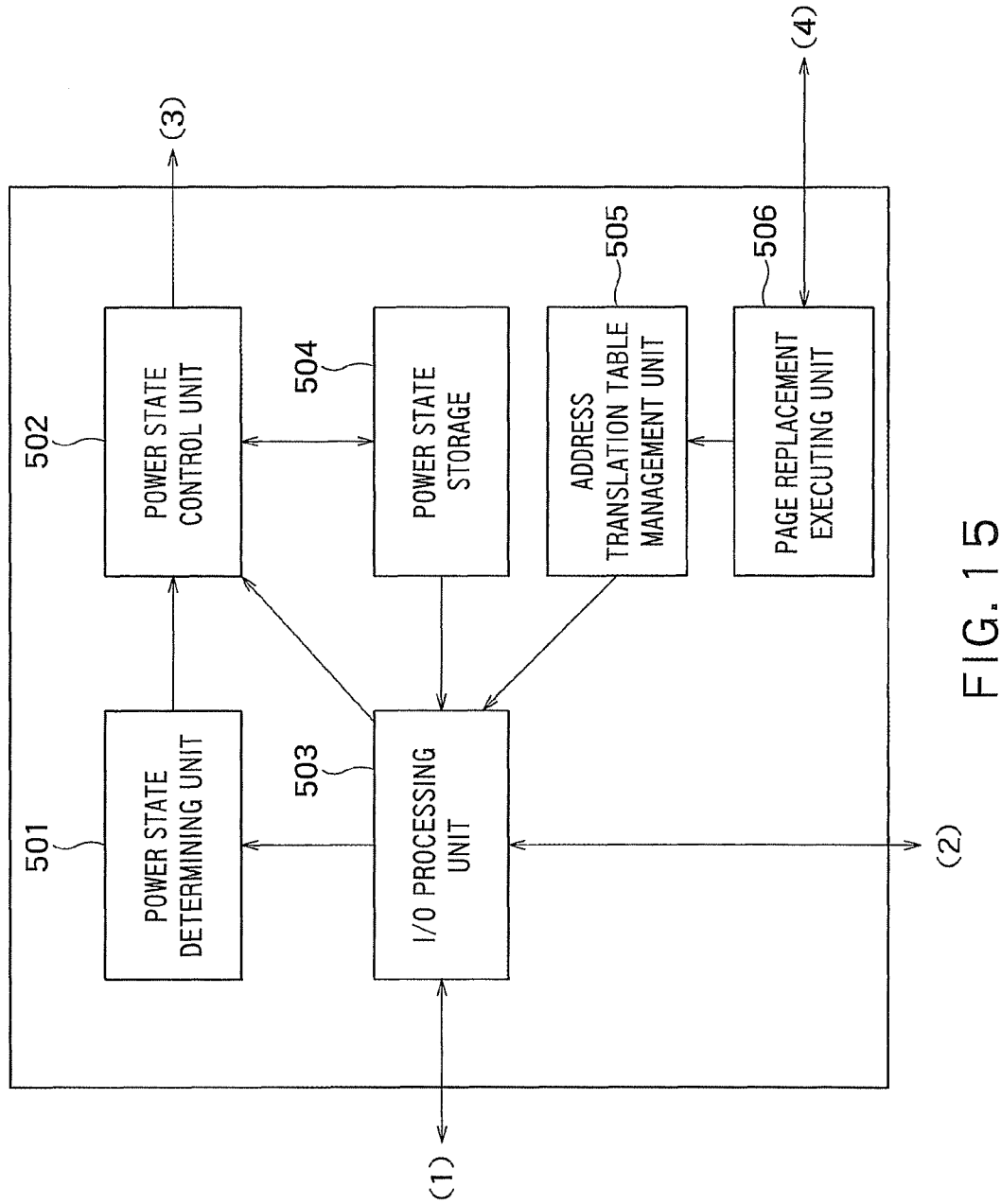
FIG. 15 is a diagram showing an example of a configuration of the computation processing apparatus according to a second embodiment.

FIG. 15 illustrates an example of a configuration of the computation processing apparatus according to the second embodiment.

The computation processing apparatus illustrated in FIG. 15 includes a power state determining unit 501, a power state control unit 502, an I/O processing unit 503, a power state storage 504, an address translation table management unit 505 and a page replacement executing unit 506. As compared with the first embodiment, the address translation table management unit 505 and the page replacement executing unit 506 are added.

The I/O processing unit 503 (which is normally the CPU), when receiving the memory access request from outside (normally from the OS) ((1)), derives the physical address associated with the logical address contained in this request out of the address translation table management unit 505. Then, I/O processing unit 503 transmits this physical address to the power state determining unit 501 and obtains information on the power state of the segment containing this physical address from the power state storage 504.

If the power state of this segment is the sleep state, the I/O processing unit 503 requests the power state control unit 502 to set this segment in the active state. Thereafter, I/O processing unit 503 executes reading or writing the data in accordance with the memory access request (the read request or the write request) ((2)). Whereas if the power state is the active state, the I/O processing unit 503 request the page replacement executing unit 506 to carry out the page replacement and requests the power state control unit 502 to return the segment to the sleep state.

Herein, if the memory access request is the read request, this read request contains the logical address information. Further, a response from the memory contains the data retained so far in the specified logical address in the memory. Furthermore, if the memory access request is the write request, the write request contains the logical address information and the data that should be written. The response from the memory contains an event which notifies of completion of writing.

The operations of the power state determining unit 501 and the power state control unit 502 are the same as those in the first embodiment, and hence the explanations thereof are omitted.

The power state storage 504 is, in the same way as in the first embodiment, stored with the power state of each of the segments.

The address translation table management unit 505 manages the associative relation (the address translation table) between the logical addresses and the physical addresses as shown in FIG. 4. Though not illustrated, the contents of the address translation are changed by the operations of the memory allocation and the memory deallocation.

The page replacement executing unit 506, upon receiving the physical address for accessing from the I/O processing unit 503, records this access. Further, when requested for the page replacement by the I/O processing unit 503, the replacement target page is determined based on the record of the access by use of, e.g., the NFU algorithm. Then, the replacement target page is replaced with the page calculated from the physical address contained in the page replacement request ((4)). This replacement operation is realized by, e.g., reading the data on both of the pages from the memory module and writing the data to a page different from the original.

[Remarks]

In the second embodiment, the OS calculates the memory access frequency and transmits, based on this access frequency, the request for changing the power state to the memory module. Another configuration is that the program such as the Daemon process running in the user space may perform these operations, and this can be realized not by the softwarewise CPU process but by the hardwarewise process differently.

The present invention can be applied to the nonvolatile memory such as the DRAM; however, when applied to the nonvolatile memory like the MRAM, the power consumption in the sleep state can be reduced to a greater degree, which is therefore further preferable.

Moreover, the present invention is also applicable to the computing machine using the plural types of memories such as the DRAM and the MRAM. In this case, it is desirable that the on-memory segment having the small power consumption in the sleep state as in the MRAM is controlled to be slept in preference to the segment on the DRAM. This can be attained by assigning the larger sequential order to the segment on the MRAM than the segment on the DRAM.

(Third Embodiment: Case of Using Virtual Memory)

In addition to the configuration of the second embodiment, a case of exploiting a virtual memory will be described. A block configuration in a third embodiment is the same as the configuration of the second embodiment. Further, the multiple variations described in the first and second embodiments are applicable to the third embodiment.

[General Operation of Virtual Memory]

The virtual memory is a technology enabling the data on the logical page to exist not on the physical memory but on other storage mediums such as the HDD. This virtual memory is implemented by extending the address translation table.

When the CPU accesses the data specified by the logical address, the MMU 15 derives an associated entry from the address translation table illustrated in FIG. 4. Items of information such as existence/non-existence information and already-assigned/not-yet-assigned information are described as attributes of this entry.

"Already-assigned" connotes that the memory has already been allocated (ensured), while "not-yet-assigned" connotes that the memory is not yet allocated.

The existence/non-existence information is information that is valid in the case of "already-assigned", in which "existence" indicates that the data exist on the physical memory. "Non-existence" represents that the data do not exist on the physical memory.

The MMU 15 examines the attribute information of the associated entry and, in the case of "already-assigned" and "non-existence", applies an interrupt to the CPU core 12.

The CPU core 12 receiving the interrupt starts up an interrupt handler and derives, from a swap translation table, what location on the HDD 41 the data are retained. The interrupt handler accesses, based on this information, the HDD 41 and stores the associated data on the physical memory 31. It is desirable that the data are stored on the active pages. The address translation table is rewritten based on the stored physical addresses. Further, the swap translation table is rewritten. Thereafter, the interrupt handler finishes processing and continues the process of accessing the memory as its initial process. The interrupt handler derives the physical address associated with the logical address from the address translation table, then accesses the physical address described therein, and is thereby enabled to access the data associated with the logical address.

Figure 12:
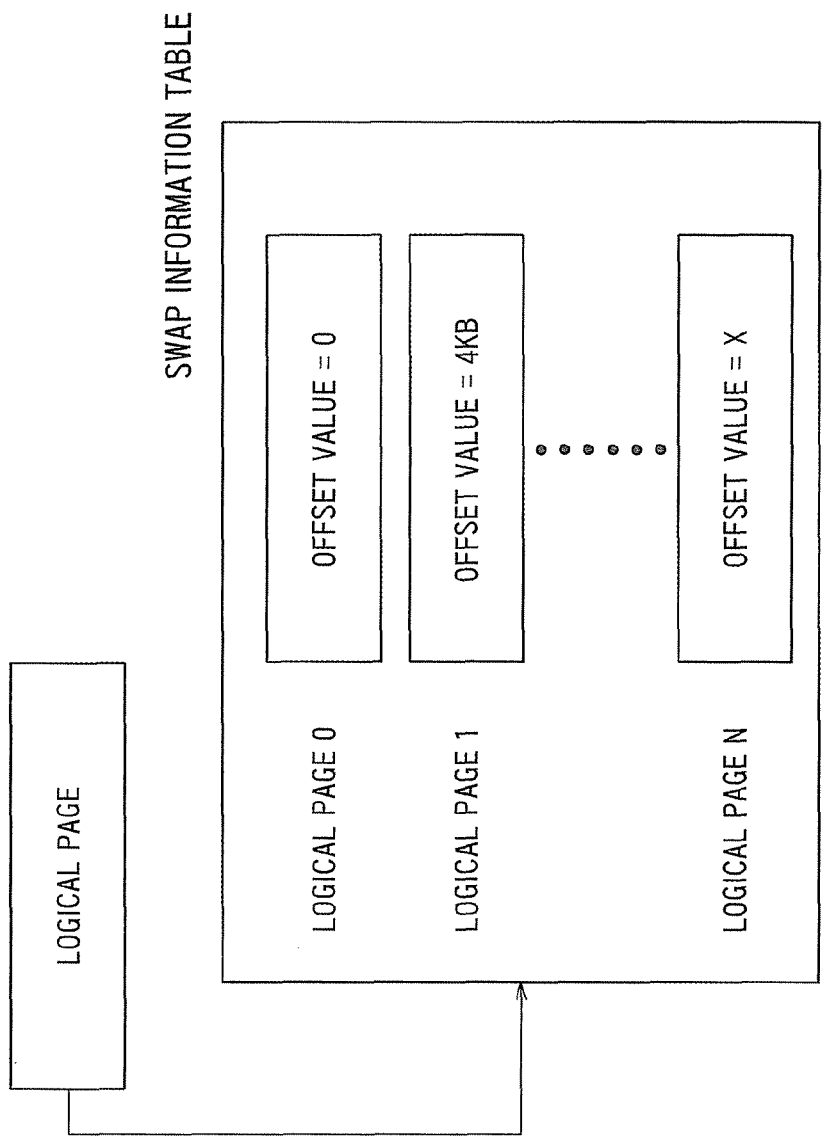
FIG. 12 is a diagram showing an example of a swap information table.

FIG. 12 illustrates the swap translation table simulatively.

In this example, a swap file on the HDD 41 retains the data associated with the logical address, and the swap information table describes which part of the swap file the data exists. For example, it is shown that the logical page 0 is retained in a 4 KB field of the head of the swap file (in such a case that a page size is 4 KB), and the logical page 1 is retained a field of 4 KB through 8 KB from the head.

Herein, the case that a swap area is retained on the HDD 41 is exemplified but can be retained not on the HDD but on an SSD (Solid-State Drive). Moreover, the swap area is retained on both of the SSD and the HDD, and the data exhibiting the higher access frequency are preferentially retained on the SSD, whereby the processing performance of the computing machine can be improved. This is because the SSD is more accessible with the low delay than the HDD.

[Operation of Writing to HDD]

Next, a process of writing the data on the physical memory 31 to the HDD 41 will be described.

(1) The empty area on the physical memory is examined at every time interval T, and a size of the empty area is calculated. The size of the empty area implies a total size of the empty area in the whole memory area.

(2) If the size of the empty area is smaller than a predetermined first threshold value, the area used for a read buffer is deallocated (freed), thereby expanding the empty area. The "read buffer" is a buffer which is used when having a read access to the file on the HDD but is still retained without deallocating this buffer (the memory area retaining the data). Owing to this read buffer, the data can be read without accessing the HDD when the access to the same file occurs again. Thus, it can be expected that the delay of the access to the file is shortened by use of the read buffer. When deallocating the read buffer, the attribute information of the entry corresponding to the deallocated area in the address translation table is set in the "not-yet-assigned" status. It is desirable that the area used for the read buffer is selected from the sleep segments.

(3) If the size of the empty area is smaller than a second threshold value, the data retained on a write buffer are written to the HDD, and the write buffer is thus deallocated, thereby expanding the empty area. The "write buffer" is a buffer which temporarily retains the write data on the physical memory without accessing the HDD when a write access request to the file on the HDD is generated from the user process or from the OS. Owing to this write buffer, when the write request occurs again, the data are rewritten without accessing the HDD by rewriting the data in the write buffer. The time required for accessing the file can be shortened by decreasing the access count of a plurality of accesses to the HDD (idealistically down to one access). On the occasion of deallocating (freeing) the write buffer, the data within the write buffer are written into the corresponding area on the HDD, and the attribute information of the entry associated with the deallocated area in the address translation table is set in the "not-yet-assigned" status. It is desirable that the segment areas belonging to the sleep segments are selected for the write buffer to be deallocated. In this case, the sleep segments are temporarily set active and are, after writing the data to the HDD, returned to the sleep state.

(4) If the size of the empty area is smaller than a third threshold value, the page, of which the access frequency on the physical memory is smallest or equal to or smaller than the threshold value, is written onto the HDD (swapping out), thereby expanding the empty area. If this page belongs to the sleep segment, the sleep segment is temporarily set active and is, after writing the data onto the HDD, returned to the sleep state.

When swapping out, the page with the small access frequency is written to the HDD, then a writing location thereof is described in the swap information table, and the attribute information of the associated entry in the address translation table is set to the "non-existence" status.

Herein, there exist a multiple variety of algorithms for selecting the page to be swapped out, such as an LRU (Least Recently Used) algorithm, an NRU (Not Recently Used) algorithm, the FIFO algorithm, the second chance algorithm, the clock algorithm, the working set algorithm and the WSClock algorithm.

Herein, it is desirable that the third threshold value is larger than the first threshold value and the second threshold value.

Furthermore, a size of the read buffer remaining on the memory without being deallocated may be changed per threshold value in a way that prepares a plurality of first threshold values (e.g., a 1-1st threshold value, a 1-2nd threshold value, a 1-3rd threshold value). Herein, it is desirable that the size of the read buffer remaining on the memory is larger as the threshold value is larger.

Moreover, a size of the write buffer remaining on the memory without being deallocated may be changed per threshold value in a way that prepares a plurality of second threshold values (e.g., a 2-1st threshold value, a 2-2nd threshold value, a 2-3rd threshold value). Herein, it is desirable that the size of the write buffer remaining on the memory is larger as the threshold value is larger.

On the occasion of deallocating the read buffer or the write buffer or performing swapping out, it is desirable that the power state of a certain sleep segment is changed to the active state, and this segment is returned to the sleep state after deallocating the read buffer and the write buffer on the segment and swapping out the data, entirely. A change count of the power state of the segment is decreased, and the improvement of the processing performance can be expected. Further, after the plurality of sleep segments has been simultaneously set in the active state, it is feasible to deallocate the read buffer or the write buffer on the segments or to execute the swap-out process.

[Remarks]

When the present invention is, though applicable to the nonvolatile memory such as the DRAM, applied to the nonvolatile memory such as the MRAM, the power consumption in the sleep state can be reduced to the greater degree, which is therefore further preferable.

(Fourth Embodiment: DMA Transfer)

The first through third embodiments have a possibility of causing a failure in a DMA (Direct Memory Access) transfer if the memory area as an accessing destination is in the sleep state in the case of making use of DMA transfer because some portions of the memory area (some segment areas) become the sleep state. Such being the case, a fourth embodiment will discuss a method of attaining the DMA transfer in the embodiments described so far. A block configuration of the fourth embodiment is the same as the configuration of the second embodiment.

[Basic Sequence of DMA Transfer]

The "DMA transfer" is a technology of transferring the data by using a DMA controller (see FIG. 1) as a substitute for the CPU when transferring the data on the bus device to the main memory (alternatively when transferring the data on the main memory to the bus device). The CPU has no necessity for executing the data transfer process and can therefore carry out the other processes exclusive of the data transfer, and the improvement of the processing performance of the computing machine can be expected.

Herein, the "bus device" connotes the device existing on the bus as in the case of the wireless NIC 51 in FIG. 1. There exist a variety of devices such as a video card that compresses and expands video data, a sound card that processes sound data and an extension board that provides an USB interface to the outside by way of examples of the bus device.

Further, not only the device on the bus in FIG. 1 but also the HDD connected to a SATA (Serial ATA) interface can be treated as the devices that perform the DMA transfer. Namely, the DMA transfer is the transfer technology of accessing the device via the connection interface thereof without using the CPU and accessing the main memory via the memory controller. In the fourth embodiment, the description will proceed in a way that uses the device on the bus by way of an example.

In FIG. 1, the DMA controller 17 exists within the CPU 11 but can be disposed on the bus device, and a plurality of DMA controllers can be also disposed within one computing machine.

A processing sequence of the DMA transfer process will be described.

To start with, the processing sequence in the case of reading will be explained.
1. The data on the bus device is requested in such a way that the process invokes a read system call.
2. This process gets slept, and hereinafter the OS handles the read system call process.
3. The data is determined to be data on the device from a value of a read source address of the read system call, and the process is handed over to a device driver corresponding to the device.
4. The device driver allocates the buffer area as the DMA transfer destination onto the main memory 31, and sets the DMA controller 17 to transfer the data specified by the read system call to the allocated buffer area.
5. The DMA controller 17 negotiates with the CPU core 12 to become a bus master, and acquires authority enabling the controller 17 itself to start the bus transfer. Thereafter, the DMA controller 17 transfers the data on the device to the buffer area by using the bus.
6. Upon finishing the DMA transfer, the DMA controller 17 applies a CPU interrupt.
7. With this interrupt, the CPU core 12 starts up the interrupt handler, and the process copies the data on the buffer area to the memory area specified by the read system call.
8. The process finishes sleeping and processes the copied data.

Next, the processing sequence in the case of writing is as follows.
1. The process makes a request for writing the data onto the bus device by invoking a write system call.
2. This process gets slept, and hereinafter the OS handles the write system call process.
3. The data is determined to be data on the device from a value of a write destination address of the write system call, and the process is handed over to a device driver corresponding to the device.
4. The device driver allocates the buffer area as the DMA transfer destination onto the main memory 31, and copies the data specified by the write system call to the allocated buffer area. Then, the device driver sets the DMA controller 17 to transfer the data in the buffer area to the transfer destination specified by the write system call.
5. The DMA controller 17 negotiates with the CPU to become the bus master, and acquires the authority enabling the controller 17 itself to start the bus transfer. Thereafter, the DMA controller 17 transfers the data in the buffer area to the device by using the bus.
6. Upon finishing the DMA transfer, the DMA controller 17 transmits the interrupt signal to the CPU core 12.
7. The process finishes sleeping and executes the next process of the write system call.

The buffer area is required to be a continuous area in terms of the physical address on the occasion of performing the DMA transfer in the case of both of reading and writing as described above. For instance, if the page size requires 4 KB and the buffer area requires 9 KB, the continuous 3 pages are needed.

Still another example of the DMA transfer illustrates a processing sequence in a case where the bus device makes a request for transferring the data to the main memory from the bus device by exemplifying the wireless NIC 51.
1. The wireless NIC 51 receives packets via a wireless link, then executes a process on a physical layer and a process on a MAC (Media Access Control) layer, accumulates the extracted packets (Ethernet frames on the Ethernet MAC layer) in the FIFO within the NIC, and transmits the interrupt signal to the CPU.
2. The CPU core 12 starts up the interrupt handler, and the device driver of the NIC 51 starts processing.
3. The device driver allocates the buffer area as the DMA transfer destination onto the main memory 31, and sets the DMA controller 17 to transfer the packets to the buffer area.
4. The DMA controller 17 negotiates with the CPU core 12 to become the bus master, and acquires the authority enabling the controller 17 itself to start the bus transfer. Thereafter, the DMA controller 17 transfers the packets in the FIFO of the NIC 51 to the buffer area.
5. Upon finishing the DMA transfer, the DMA controller 17 transmits the CPU interrupt signal.
6. With this interrupt, the CPU core 12 starts up the interrupt handler and processes the packets in the buffer area.

[Case of Not Sleeping Buffer Area for DMA]
[Outline of Operation]

Separately from the DMA transfer sequence described above, the device driver previously allocates the buffer area used for the DMA transfer for the OS when in initialization thereof (e.g., when booting the OS or when loading the device driver in the case of the dynamically loadable device driver). The segment retaining the allocated area is not set in the sleep state. To explain the operation with reference to the block diagram, in the computation processing apparatus, the I/O processing unit 503 includes a unit that allocates the buffer area for the direct memory access to the segment, and the power state determining unit 501 determines to keep the segment with the buffer area being allocated active. On the occasion of allocating the buffer area in the DMA transfer sequence described above, the DMA transfer destination (or transfer source) can be invariably set to the segment in the active state by using this previously allocated area.

Further, it is desirable that the area for allocating the buffer area is reserved as the area for allocating the buffer area when the device driver will be loaded in the future, and the OS does not employ this area for other processes. It is desirable, e.g., on the Linux platform that the OS uses the memory from the lower-order side of the physical addresses, and hence this reserved area is allocated from the higher-order side of the physical addresses. With this allocation, the buffer area can be allocated (ensured) also when the device driver is dynamically loaded.

[Operating Sequence]

An in-depth description of how the reserved area is allocated will be made.

The device driver allocates, on the occasion of the initializing process, the buffer area for the DMA transfer for the memory management function of the OS. To be specific, the device driver notifies the OS memory management function of a necessary size of the area, and the OS memory management function allocates the buffer area from the higher-order side of the physical addresses and notifies the device driver of a start address of this buffer area.

Figure 16:
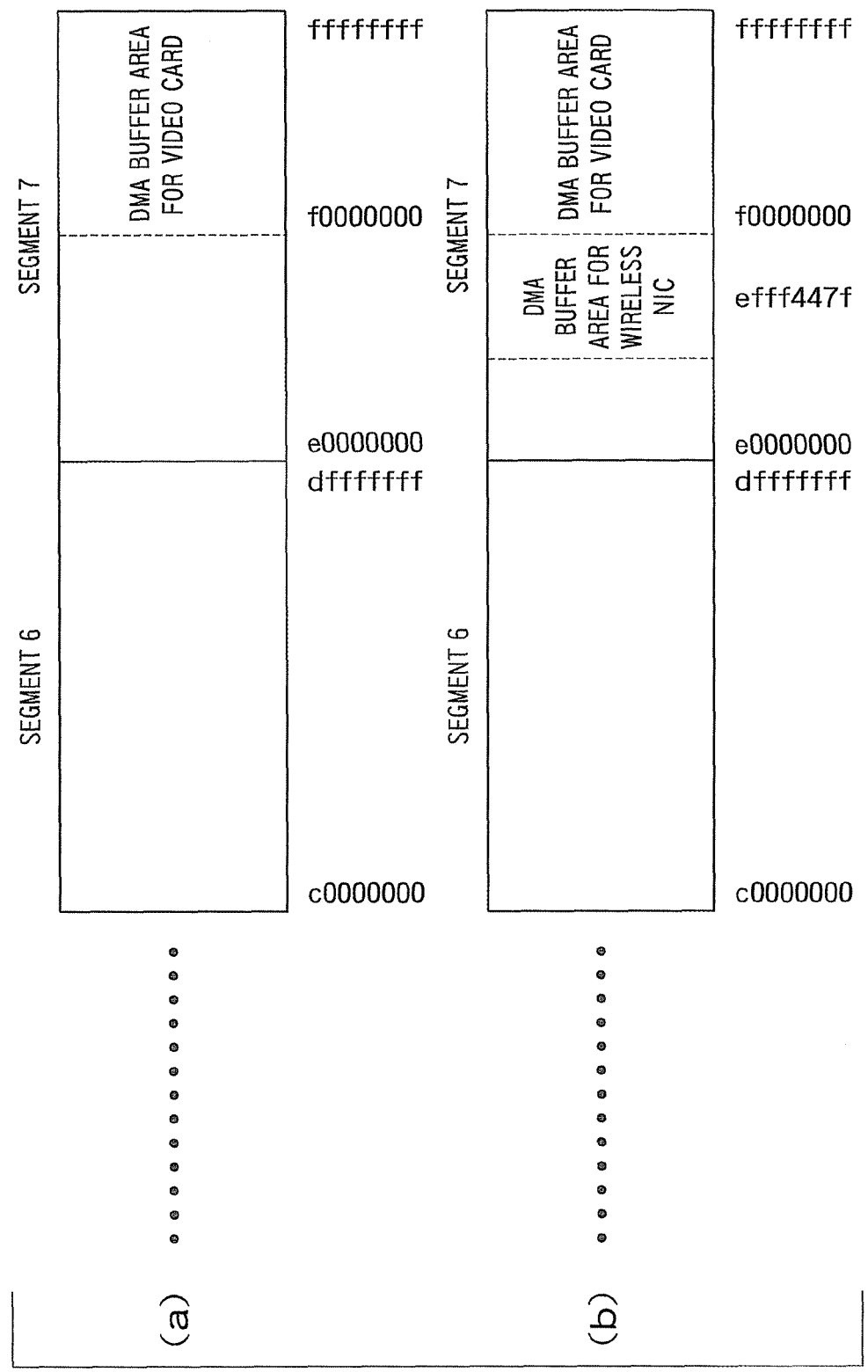
FIG. 16 is a diagram simulatively illustrating how a buffer area is allocated.

FIG. 16 simulatively illustrates how this buffer area is allocated.

A structure of the physical addresses is as shown in FIG. 3, in which case FIG. 16 depicts a segment 6 and a segment 7. FIG. 16(*a*) illustrates how the buffer area for the DMA transfer to a video card is already reserved (the area specified by the physical addresses "f0000000" through "ffffffff"). Moreover, FIG. 16(*b*) illustrates how the device driver of the wireless NIC requests the OS to reserve the buffer area having a size of 48 KB.

The OS allocates the area specified by the physical addresses "efff447f" through "dfffffff", and notifies the device driver of the start address "efff447f" thereof. Herein, the segment 7 is set in the active state at all times but is not set as the page replacement target given in the second embodiment. The OS allocates the reserved area as the continuous area; however, any inconvenience may not be caused by extending over the segments. Further, for instance, when the buffer area is allocated newly on the segment 6, the segment 6 is always set in the active state. Namely, when the reserved area for allocating the buffer exists over the plurality of segments, it is desirable that the segment with the buffer not being allocated is set in the sleep state, while the segment with the buffer being allocated is set in the active state.

[Usage Method of Buffer Very Because of Buffer Area Being Always Active]

The device driver of the wireless NIC 51 performs the DMA transfer by use of the buffer area allocated when initialized. On this occasion, as described above, the wireless NIC 51, whenever receiving the packet, transmits the interrupt signal and can, as triggered by this signal, notify of the buffer area for the DMA transfer; however, an example of yet another processing sequence will be herein discussed.

1. When initializing the device driver of the wireless NIC 51, as in FIG. 16, the buffer area for the DMA transfer is allocated.
2. The device driver notifies the DMA controller 17 of this buffer area and permits the DMA transfer.
3. The wireless NIC 51, upon receiving the packet and accumulating this packet in the FIFO, transfers the packet data toward the buffer area notified to the DMA controller 17, and transmits the interrupt signal to the CPU.
4. The CPU, when receiving the interrupt signal, implements the packet processing function via the interrupt handler.
5. The packet processing function processes the packet transferred to the buffer area.

Herein, the packet processing function processes the packet, during which the wireless NIC 51 receives the packet, and hereat the DMA controller 17 performs the DMA transfer of the packet data to the empty area in the buffer area and transmits the interrupt signal to the CPU. The packet processing function start, after finishing the present packet processing, processing the packet that is DMA-transferred second.

Herein, it is desirable that the DMA controller 17 uses the buffer area as a ring buffer. That is, when the packet data go on being transferred from the start of the buffer area and used up to the end of the buffer area, the buffer area is again used from the start. It is desirable at this time that the packet processing function and the DMA controller 17 are shared with pieces of information indicating which location of the buffer area the packet data exists and which packet data finishes being processed. Moreover, it is desirable that if the packet processing function does not keep up with processing and if the buffer area gets full of the not-yet-processed packet data, the DMA controller 17 stops the new DMA transfer.

Further, it is desirable in this example that the DMA controller 17 exists on the wireless NIC 51. Thus, the device includes a dedicated DMA controller, whereby a load for setting the DMA controllers on the occasion of existences of the plurality of devices can be reduced.

Still further, in this example, each time the DMA transfer of one piece of packet data is completed, the DMA controller 17 transmits the interrupt signal. The configuration may be modified by way of a different configuration so that the interrupt signal is transmitted each time the DMA transfer of a predetermined number (5 pieces) of packet data is completed. With this modified configuration, the processes of the CPU interrupt signals can be decreased. In this case, if the FIFO gets emptied and there is not packet that should be transferred before the predetermined number of packet data are DMA-transferred, it is desirable that the DMA controller transmits the interrupt signal to the CPU.

[Buffer Area for DMA Transfer Being Slept But Set Active After Failure in DMA Transfer]

In the previous example, the segment stored with the buffer area is always set in the active state; however, such a configuration can be also taken that if there is no access to the segment for a fixed period of time, this segment is changed from the active state to the sleep state. With this configuration, a further reduction of the power consumption can be attained. If the fixed period of time at this time is "0", this implies that the segment transitions to the sleep state upon finishing the DMA transfer. The operation in the block diagram is that the power state determining unit 501 determines that the segment is set in the sleep state after completing the direct memory access to the segment in a status where the segment is set in the active state. The power state control unit 502 sets, based on this determination, the segment in the sleep state.

At this time, the DMA controller 17 fails in transferring the data because of transferring the data to the buffer area on the sleep segment. Then, the DMA controller 17, when detecting the failure in the data transfer, transmits the interrupt signal to the CPU, and, after the program running on the CPU receiving this interrupt signal sets the segment in the active state, again performs the DMA transfer. The DMA transfer to the buffer area on the sleep segment is thus implemented. Processing procedures of this operation are given as below.

1. The DMA controller 17 detects the failure in the data transfer. The failure is detected based on whether or not a data transfer successful signal is received within a fixed period of time. The I/O processing unit 503 of the computation processing apparatus in the block diagram includes a unit which detects a failure in the direct memory access to the segment in the sleep state.
2. The DMA controller 17 transmits the interrupt signal to the CPU.
3. The CPU implements the device driver corresponding to the device from the device information contained in the interrupt signal.
4. The device driver searches for the segment information management table and thus obtains the segment number from the physical address of the retained buffer area. Then, the device driver transmits a command of changing power state of the segment specified this number to the active state. To describe the operation with reference to the block diagram, the power state determining unit 501 of the computation processing apparatus, when detecting the failure, determines that the segment changes from the sleep state to the active state, and the power state control unit 502 sets the segment in the active state.
5. The device driver sets the DMA controller 17 to implement again the DMA transfer.

Herein, the DMA controller 17 detects the failure in the DMA transfer; however, the failure can be detected in a variety of portions. For instance, the memory controller as a substitute can also detect this failure.

The sequence given above is also effective in the DMA transfer pattern described in the section [Basic Sequence of DMA Transfer].

[Set Segment Active Before DMA Transfer]

In the previous example, when performing the DMA transfer onto the sleep segment, retransferring is conducted after detecting the failure in the DMA transfer; however, another example is given herein.

The DMA controller 17 is, when notified of the buffer area, simultaneously notified also of the segment number of the segment stored with the buffer area. Then, the DMA controller 17 transmits at first, when performing the DMA transfer, the command of setting the segment in the active state to the memory controller and thereafter carries out the DMA transfer, whereby the DMA transfer can be performed without any failure. To describe the operation with reference to the block diagram, the I/O processing unit 503 of the computation processing apparatus includes a unit that detects which state, the active state or the sleep state, the segment to be accessed through the direct memory access is in. The power state determining unit 501 determines that the segment is set in the active state when the sleep state is detected, and the power state control unit 502 sets the segment active.

It is also practicable that not the DMA controller 17 but the memory controller transmits the command of setting this segment active. In this case, the memory controller has the segment information management table or a part of this table, and derives the segment number and the power state of the segment from the physical address information of the memory access command given from the DMA controller 17. The memory controller, if the segment is in the sleep state, changes the power state thereof to the active state, and transfers the data received from the DMA controller 17 to the memory. As a matter of course, the memory controller sets the power state active similarly also in the case of transferring the data to the device from the memory.

Alternatively, if the CPU sets the buffer area in the DMA controller 17 in advance of the DMA transfer (the processing sequence described in the section [Basic Sequence of DMA Transfer]), the CPU derives the segment number and the power state with respect to this buffer area from the segment information management table. The CPU, if the segment specified by this segment number is in the sleep state, changes the power state to the active state and thereafter instructs the DMA controller 17 to perform the DMA transfer. The DMA transfer onto the sleep segment can thereby prevented. In this case, when the CPU receives the interrupt signal of completion of the DMA transfer, this segment may be returned to the sleep state.

[Remarks]

In the fourth embodiment, if the segment allocated with the buffer area has a free space, the page can be placed therein. In this case, it is desirable that this segment has the smallest segment sequential order.

Not in the case of allocating the buffer area when initializing the device driver but in the case of allocating the buffer area for every DMA transfer, the DMA transfer can be also performed by allocating the buffer area on the active segment. In this instance, if the continuous area having a desired size cannot be allocated, it is desirable to prepare the buffer area by writing the page onto the active segment onto the sleep segment or onto the HDD.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A non-transitory computer readable medium having instructions stored therein which, when executed by a computer, cause the computer to execute at least:

storing, in a storage, an access count for each of a plurality of segment areas in a memory area;

calculating an access load corresponding to an access frequency for each segment area based on each access count for each segment area and comparing the access load of each segment area with a threshold value corresponding to each segment area to determine a state of each segment area as one of a plurality of power states including a first power state and a second power state having a power consumption lower than that of the first power state; and setting each segment area to the power state determined for the segment area, wherein the threshold value corresponding to each segment area is defined in accordance with a first power value for keeping the segment area in the first power state, a second power value for keeping the segment area in the second power state, a third power value for transitioning the segment area from the first power state to the second power state, and a fourth power value for transitioning the segment area from the second power state to the first power state, and wherein the threshold value corresponding to each segment area is obtained by dividing a difference between the second power value and the first power value by a sum of the third power value and the fourth power value.

2. The medium according to claim 1, wherein the first power state is a state enabling memory access to be performed, the second power state is a state disabling memory access from being performed, and the setting includes, when requested to have memory access to a segment area in the second power state, setting the segment area corresponding to the request to the first power state and returning the segment area to the second power state after completing memory access.

3. The medium according to claim 2, further including instructions for causing the computer to execute:

reading first data contained in a requested area within the segment area in the second power state, and storing the first data in an area within a segment area in the first power state; and managing an associative relation between an address of the requested area and an address of the area storing the first data.

4. The medium according to claim 3, further including instructions for causing the computer to execute:

reading, before the first data is stored in the area within the segment area in the first power state, second data stored in the area and storing the second data in the requested area within the segment area in the second power state, and managing an associative relation between an address of the area from which the second data is read and an address of the requested area storing the second data.

5. The medium according to claim 3, further including instructions for causing the computer to execute:

changing, in a case of writing data within the segment area in the second power state to an external storage, the power state of the segment area to the first power state and, after writing the data, returning the power state of the area to the second power state.

6. The medium according to claim 3, further including instructions for causing the computer to execute:

writing, in the case of accessing data stored in an external storage, the data read from the external storage to the segment area in the first power state.

7. The medium according to claim 1, further including instructions for causing the computer to execute:

allocating a buffer area for direct memory access to the segment area, keeping the segment area allocated with the buffer area in the first power state.

8. The medium according to claim 1, further including instructions for causing the computer to execute:

detecting a failure in direct memory access to the segment area in the second power state, and changing the second power state of the segment area to the first power state.

9. The medium according to claim 8, further including instructions for causing the computer to execute:

after the segment area is set in the first power state and the direct memory access to the segment area is completed, returning the power state of the segment area to the second power state.

10. The medium according to claim 1, further including instructions for causing the computer to execute:

detecting which state, the first power state or the second power state, a segment area to be accessed through direct memory access is in, and setting, when detecting the second power state, the segment area to the first power state.

11. A computation processing apparatus comprising:

a hardware storage for storing an access count for each of a plurality of segment areas in a memory area;

a power state determining unit, implemented by circuitry, configured to calculate an access load corresponding to an access frequency for each segment area based on each access count for each segment area and comparing the access load of each segment area with a threshold value corresponding to each segment area to determine a state of each segment area as one of a plurality of power states including a first power state and a second power state having a power consumption lower than that of the first power state; and a power state control unit, implemented by circuitry, configured to set each of the segment areas to the power state determined for the segment area, wherein the threshold value corresponding to each segment area is defined in accordance with a first power value for keeping the segment area in the first power state, a second power value for keeping the segment area in the second power state, a third power value for transitioning the segment area from the first power state to the second power state, and a fourth power value for transitioning the segment area from the second power state to the first power state, and wherein the threshold value corresponding to each segment area is obtained by dividing a difference between the second power value and the first power value by a sum of the third power value and the fourth power value.

12. The apparatus according to claim 11, wherein the first power state is a state enabling memory access to be performed, the second power state is a state disabling memory access from being performed, and the power state control unit, when requested to have memory access to a segment area in the second power state, sets the segment area corresponding to the request to the first power state and returns the segment area to the second power state after completing memory access.

13. The apparatus according to claim 12, further comprising an executing unit, implemented by circuitry, configured to read first data contained in a requested area within the segment area in the second power state, and store the first data in an area within a segment area in the first power state; and a management unit, implemented by circuitry, configured to manage an associative relation between an address of the requested area and an address of the area storing the first data.

14. The apparatus according to claim 13, wherein the executing unit reads, before the first data is stored in the area within the segment area in the first power state, second data stored in the area and stores the second data in the requested area within the segment area in the second power state, and the management unit manages an associative relation between an address of the area from which the second data is read and an address of the requested area storing the second data.

15. The apparatus according to claim 13, wherein the power state control unit changes, in a case of writing data within the segment area in the second power state to an external storage, the power state of the segment area to the first power state and, after writing the data, returns the power state of the area to the second power state.

16. The apparatus according to claim 13, further comprising an executing unit, implemented by circuitry, configured to write, in the case of accessing the data stored in the external storage, the data read from the external storage to the segment area in the first power state.

17. The apparatus according to claim 11, further comprising a unit, implemented by circuitry, configured to allocate a buffer area for direct memory access to the segment area,
wherein the power state determining unit keeps the segment area allocated with the buffer area in the first power state.

18. The apparatus according to claim 11, further comprising a unit, implemented by circuitry, configured to detect a failure in direct memory access to the segment area in the second power state,
wherein the power state determining unit determines, when detecting the failure, to change the second power state of the segment area to the first power state, and
the power state control unit sets the segment area to the first power state.

19. The apparatus according to claim 18, wherein the power state determining unit, after the segment area is set in the first power state and the direct memory access to the segment area is completed, determines to return the power state of the segment area to the second power state.

20. The apparatus according to claim 11, further comprising a unit, implemented by circuitry, configured to detect which state, the first power state or the second power state, a segment area to be accessed through direct memory access is in,
wherein the power state determining unit determines, when detecting the second power state, to set the segment area to the first power state, and
the power state control unit sets the segment area to the first power state.

21. A computing machine comprising:
an input for receiving an input:
a display for displaying an image:
communication circuitry for communicating with a network:
a CPU (Central Processing Unit):
a memory access device, implemented by circuitry, for accessing a memory having a memory area including a plurality of segment areas: and
a computation processing apparatus implemented by circuitry,
wherein the computation processing apparatus is configured to at least:
calculate an access load corresponding to an access frequency for each segment area based on an access count for each segment area in the memory area;
compare the access load of each segment area with a threshold value corresponding to each segment area to determine a state of each segment area as one of a plurality of power states including a first power state and a second power state having a power consumption lower than that of the first power state; and
sets each segment area to the power state determined for the segment area,
wherein the threshold value corresponding to each segment area is defined in accordance with a first power value for keeping the segment area in the first power state, a second power value for keeping the segment area in the second power state, a third power value for transitioning the segment area from the first power state to the second power state, and a fourth power value for transitioning the segment area from the second power state to the first power state, and
wherein the threshold value corresponding to each segment area is obtained by dividing a difference between the second power value and the first power value by a sum of the third power value and the fourth power value.

22. The computing machine according to claim 21, wherein the computation processing apparatus is included in the CPU.

23. The computing machine according to claim 21, wherein the computation processing apparatus is included in the memory.

24. The computing machine according to claim 21, wherein the memory access device is included in the CPU.

25. A memory management method performed by a computer, comprising:
storing, in a storage, an access count for each of a plurality of segment areas in a memory area;
calculating an access load corresponding to an access frequency for each segment area based on each access count for each segment area;
comparing the access load of each segment area with a threshold value corresponding to each segment area to determine a state of each segment area as one of a plurality of power states including a first power state and a second power state having a power consumption lower than that of the first power state;
setting each segment area to the power state determined for the segment area,
wherein the threshold value corresponding to each segment area is defined in accordance with a first power value for keeping the segment area in the first power state, a second power value for keeping the segment area in the second power state, a third power value for transitioning the segment area from the first power state to the second power state, and a fourth power value for transitioning the segment area from the second power state to the first power state, and
wherein the threshold value corresponding to each segment area is obtained by dividing a difference between the second power value and the first power value by a sum of the third power value and the fourth power value.

* * * * *